(12) United States Patent
Fujita et al.

(10) Patent No.: US 12,407,282 B2
(45) Date of Patent: Sep. 2, 2025

(54) FIELD WINDING INTERLAYER SHORT-CIRCUIT MONITORING DEVICE AND FIELD WINDING INTERLAYER SHORT-CIRCUIT MONITORING METHOD

(71) Applicant: TOSHIBA ENERGY SYSTEMS & SOLUTIONS CORPORATION, Kawasaki (JP)

(72) Inventors: Masafumi Fujita, Yokohama Kanagawa (JP); Yasuo Kabata, Yokohama Kanagawa (JP); Toshio Hirano, Yokohama Kanagawa (JP); Yuichiro Gunji, Yokohama Kanagawa (JP); Masashi Kobayashi, Kawasaki Kanagawa (JP); Hirotada Endo, Ota Tokyo (JP); Koji Ando, Yokohama Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/402,437

(22) Filed: Jan. 2, 2024

(65) Prior Publication Data

US 2024/0322719 A1    Sep. 26, 2024

(30) Foreign Application Priority Data

Mar. 22, 2023    (JP) ................. 2023-045718

(51) Int. Cl.
*H02P 9/00*    (2006.01)
(52) U.S. Cl.
CPC .................... *H02P 9/006* (2013.01)
(58) Field of Classification Search
CPC ....................................................... H02P 9/006
See application file for complete search history.

(56) References Cited

U.S. PATENT DOCUMENTS

2010/0194323 A1    8/2010   Premerlani et al.
2017/0292996 A1*  10/2017   Desabhatla .......... G01R 31/346
(Continued)

FOREIGN PATENT DOCUMENTS

CN    114740405 A    7/2022
ES       2936386 A1    3/2023
(Continued)

OTHER PUBLICATIONS

AU Office Action/Examination Report 1 for AU Appl. Ser. No. 2024200047 dated Oct. 31, 2024 (8 pages).

*Primary Examiner* — Julio C. Gonzalez
(74) *Attorney, Agent, or Firm* — Foley & Lardner LLP

(57) ABSTRACT

According to an embodiment, a field winding interlayer short-circuit monitoring device comprises: an input unit configured to obtain field winding current values and field winding voltage values at a predetermined sampling cycle; a memory configured to store field winding resistance versus current characteristic curves at an abnormal state and a normal state; and a field winding resistance calculator configured to calculate a field winding resistance value by dividing the field winding voltage value by the field winding current; an average value calculator configured to calculate an average resistance value and an average current value by averaging those obtained during a predetermined time interval; and an image data generator configured to generate image data to display a predetermined number of average value data along with the field winding resistance versus current characteristic curves at the normal state and the abnormal state.

7 Claims, 17 Drawing Sheets

(56) References Cited

U.S. PATENT DOCUMENTS

2021/0033674 A1* 2/2021 Hirano ................ G01R 31/346
2021/0293886 A1 9/2021 Sato et al.

FOREIGN PATENT DOCUMENTS

| JP | S63-31448 A | 2/1988 |
| JP | 2009-300250 A | 12/2009 |
| JP | 2021-023050 A | 2/2021 |
| JP | 2021-151007 A | 9/2021 |
| WO | WO-2022/087726 A1 | 5/2022 |

* cited by examiner

FIELD WINDING INTERLAYER SHORT-CIRCUIT MONITORING DEVICE AND FIELD WINDING INTERLAYER SHORT-CIRCUIT MONITORING METHOD

CROSS-REFERENCE TO RELATED APPLICATION

This application is based upon and claims the benefit of priority from Japanese Patent Application No. 2023-045718 filed on Mar. 22, 2023, the entire content of which is incorporated herein by reference.

FIELD

Embodiments disclosed herein relate to a field winding interlayer short-circuit monitoring device and a field winding interlayer short-circuit monitoring method.

BACKGROUND

Generally, rotary electric machines such as turbine generators installed in power generation plants and other plants have field windings composed of a plurality of layers of conductors insulated from each other to generate a magnetic field in their rotor or stator. Wire-winding electric motors, and other motors also have field windings in the same way.

FIG. 15 is a conceptual partial perspective diagram illustrating a general rotor 2 of a rotary electric machine 1. FIG. 16 is a conceptual perspective diagram illustrating a general field winding 20 of the rotary electric machine 1.

The rotor 2 has a rotor core 10 and field windings 20. The rotor core 10 has rotor teeth 12 spaced from each other in a circumferential direction and extending axially. Two rotor teeth 12 adjacent to each other in the circumferential direction form an axially-penetrating rotor slot 11.

As illustrated in FIG. 16, the field winding 20 has a field winding conductor 21 wound around the rotor teeth 12 and is coiled as a whole. The field winding 20 has a rotor core inner part 20a, which is the portion inside the rotor slot 11, and a rotor core outer part 20b, which is the portion outside the rotor slot 11 (FIG. 16). The field winding conductors 21 adjacent to each other are electrically insulated by an interlayer insulation 22 provided therebetween, preventing a short-circuit current from flowing between the field winding conductors 21 adjacent to each other. To prevent the rotor core inner part 20a from protruding radially outward from the rotor slot 11, a wedge 23 is provided in a radially outer portion in the rotor slot 11.

When a short circuit occurs between the field winding conductors 21, called an interlayer short circuit, due to factors such as deterioration or damage to the interlayer insulation, the effective number of turns of the field winding 20 decreases, resulting in a reduction in the magnetic field generated and other performance degradation of the rotary electric machine 1. Therefore, early detection of the interlayer short circuit is an important technology in terms of maintaining the performance of the entire machine or plant in which the rotary electric machine 1 is installed. In addition to degradation over time, the degradation of the interlayer insulation 22 may also be accelerated by temperature changes in the windings due to changes in operating conditions. The risk of interlayer short circuit increases in the rotary electric machine 1, which is often operated under fluctuating partial load or power factor, and early detection of the interlayer short circuit is particularly important.

FIG. 17 is a conceptual graphic chart illustrating an example of fluctuation of a field winding current over time under normal conditions. The horizontal axis is time and the vertical axis is the field winding current. The field winding current fluctuates by adjusting the field winding current to generate a field magnet of a relevant power generation amount required according to the output and power factor. A cycle of fluctuation is, for example, on the order of minutes, and the aspects of the fluctuation varies with a longer cycle. A field winding current change amount $\Delta I_F$ in this case is about 2% to 3% of the field winding current value, for example.

On the other hand, when the number of turns of the field winding is, for example, 100, the decrease in resistance of the field winding at the short-circuit time between adjacent layers is $1/100$, which means that a current fluctuation value due to the short circuit is about 1%. That is, it is usually difficult to determine the presence or absence of the interlayer short circuit only from the change in the field winding current value.

DETAILED DESCRIPTION

An object of the present invention is to provide a field winding interlayer short-circuit monitoring device and a field winding interlayer short-circuit monitoring method that can easily determine presence or absence of interlayer short circuits in field windings when operating and monitoring power plants.

According to an aspect of the present invention, there is provided a field winding interlayer short-circuit monitoring device, comprising: a field winding interlayer short-circuit monitoring device for a rotary electric machine, the device comprising: an input unit configured to obtain field winding current values and field winding voltage values at a predetermined sampling cycle; a memory configured to store field winding resistance versus current characteristic curves in an abnormal state with interlayer short-circuits and in a normal state without interlayer short-circuit; and a field winding resistance calculator configured to calculate a field winding resistance value by dividing each of the field winding voltage values by each of the field winding current values corresponding to each of the field winding voltage values; an average value calculator configured to calculate an average resistance value and an average current value by averaging the field winding resistance values and the field winding current values obtained during a predetermined time interval respectively; and an image data generator configured to generate image data to display a predetermined number of average value data each composed of the average resistance value and the average current value along with the field winding resistance versus current characteristic curves in the normal state and the abnormal state.

Hereinafter, a field winding interlayer short-circuit monitoring device and a field winding interlayer short-circuit monitoring method using the device according to embodiments of the present invention will be described with reference to the drawings. Here, substantially the same or similar components are denoted by the same reference signs and redundant descriptions thereof may be omitted.

First Embodiment

Figure 1:
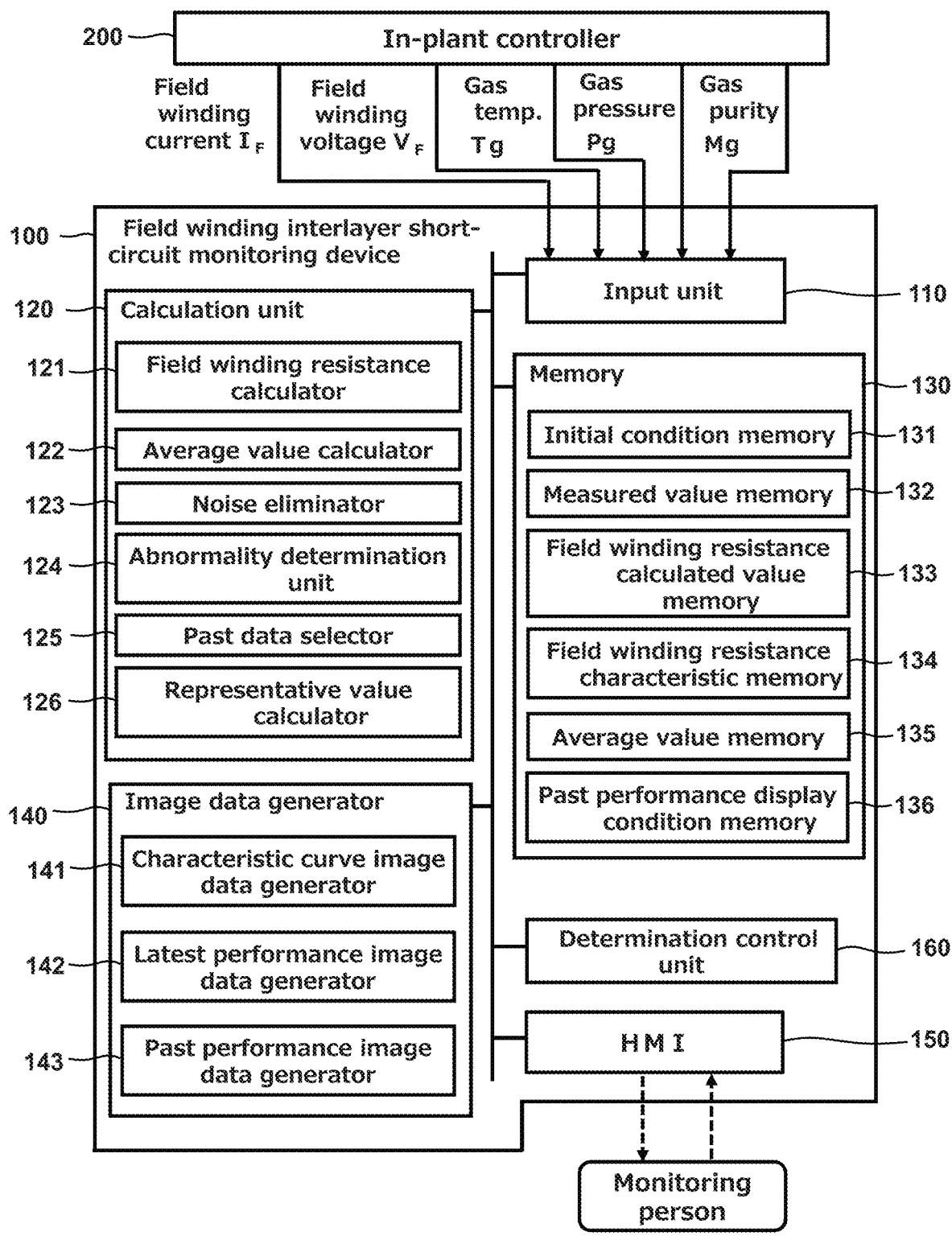
FIG. 1 is a block diagram illustrating a configuration of a field winding interlayer short-circuit monitoring device of a first embodiment.

FIG. 1 is a block diagram illustrating a configuration of a field winding interlayer short-circuit monitoring device 100 of a first embodiment.

Figure 15:
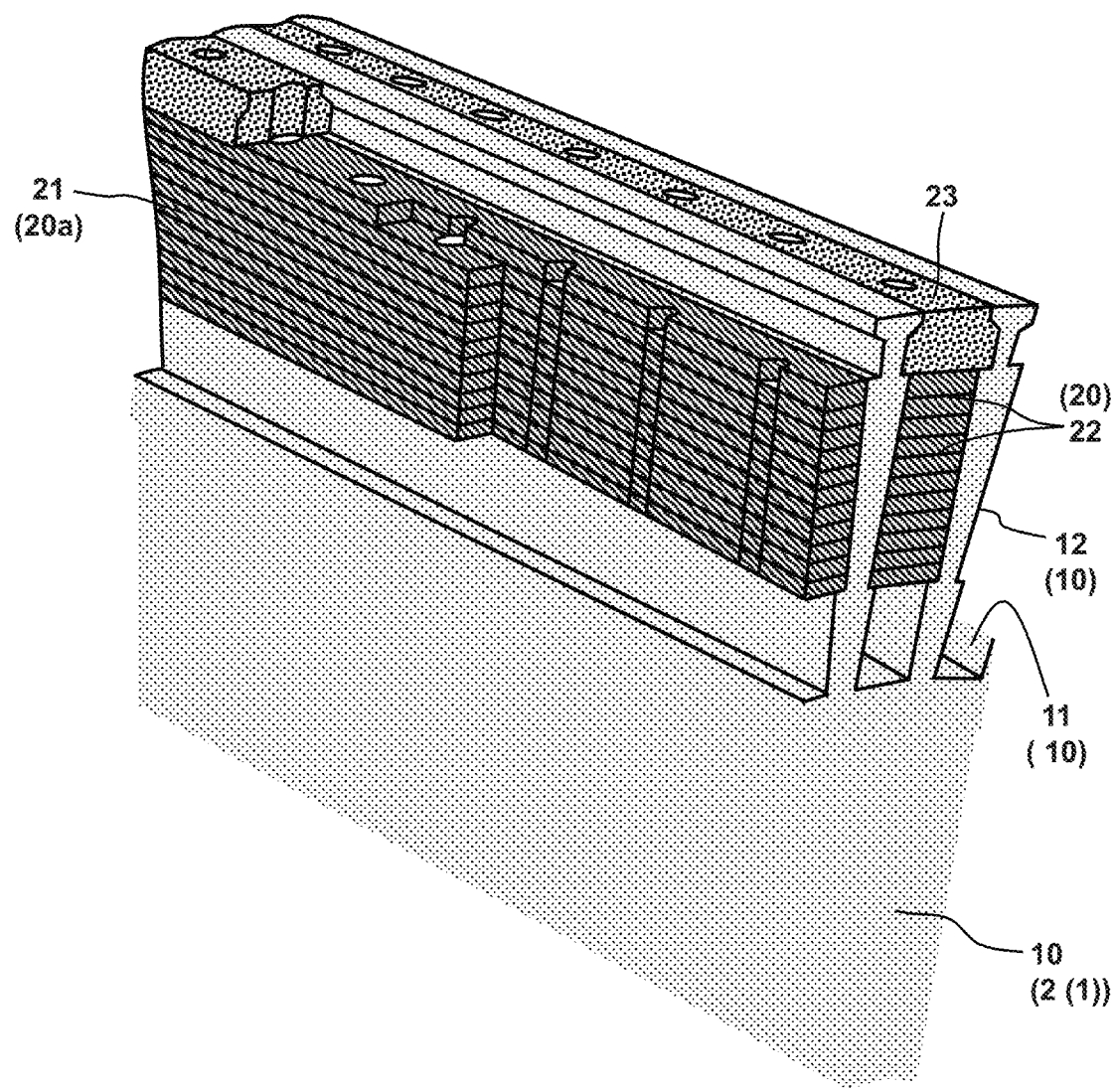
FIG. 15 is a conceptual partial perspective diagram illustrating a general rotor of a rotary electric machine.

The field winding interlayer short-circuit monitoring device 100 monitors interlayer short circuits in field windings 20 (FIG. 15) of a rotary electric machine 1. The field winding interlayer short-circuit monitoring device 100 has an input unit 110, an calculation unit 120, a memory 130, an image data generator 140, a human-machine interface (HMI) 150, and a determination control unit 160.

The input unit 110 accepts field winding current values $I_F$ and field winding voltage values $V_F$ from an in-plant controller 200, such as a DCS (distributed control system), for example, and obtains the field winding current values $I_F$ and field winding voltage values $V_F$ at a predetermined sampling cycle $\Delta t$, such as one minute, for example. The field winding current value $I_F$ and field winding voltage value $V_F$ may be directly accepted from a field winding current detector and field winding voltage detector, which are not illustrated in the drawings, respectively.

The calculation unit 120 has a field winding resistance calculator 121, an average value calculator 122, a noise eliminator 123, an abnormality determination unit 124, a past data selector 125, and a representative value calculator 126. The calculation unit 120 may be, for example, a computer or a set of calculation units with respective functions. Each element of the calculation unit 120 is described sequentially below.

The field winding resistance calculator 121 calculates a field winding resistance value $R_F$ by dividing each of the obtained field winding voltage values $V_F$ by each of the field winding current values $I_F$ corresponding to each of the field winding voltage values $V_F$.

The average value calculator 122 calculates an average value of the field winding resistance values $R_F$ and an average value of the field winding current values $I_F$ calculated based on the field winding voltage values $V_F$ and field winding current values $I_F$ obtained during a predetermined time interval $\Delta T$, such as 10 minutes, for example. The predetermined time interval $\Delta T$ is set in consideration of responsiveness and ease of monitoring. The predetermined time interval $\Delta T$ is stored by the average value calculator 122 as a default value but can be specified or changed by accepting it as an external input by the HMI 150. The number of data M in the predetermined time interval $\Delta T$ is an integer obtained by rounding off a value of $\Delta T/\Delta t$, for example. For example, when the sampling cycle $\Delta t$ is one minute and the predetermined time interval $\Delta T$ is 10 minutes, the number of data M is 10.

The average value calculator 122 calculates an average resistance value $R_{FA}(k)$ of the field winding resistance values $R_F$ and an average current value $I_{FA}(k)$ of the current values $I_F$ of the predetermined number, M pieces, of consecutive field windings based on the following equations (1) and (2), respectively. Here is the number of consistent numbering for the predetermined time interval, that is, the order of the predetermined time interval.

$$R_{FA}(k) = \left(\sum R_F(m)\right)/M \qquad (1)$$

$$I_{FA}(k) = \left(\sum I_F(m)\right)/M \qquad (2)$$

Here, $R_F$ (m) and $I_F$ (m) are the m-th field winding resistance value $R_F$ and field winding current value $I_F$ at the predetermined time interval $\Delta T$, respectively, and $\Sigma$ is a total value of m from one to M. Hereinafter, a combination data of the average resistance value $R_{FA}(k)$ and the corresponding average current value $I_{FA}(k)$ will be referred to as an average value data. A plurality of consecutive average value data shall be referred to as an average value data group. The predetermined number M is stored in the average value calculator 122 but can be specified or changed by input from the HMI 150.

The noise eliminator 123 excludes a value of the obtained field winding current value $I_F$ from the data to be processed when the current value is a noisy fluctuation.

Concretely, when $R_F$ (n) is a determination target, the noise eliminator 123 checks whether the following inequalities (3) and (4) are satisfied for $R_F$ (n) and $R_F$ (n+1).

$$|R_F(n) - R_{FA}(n_0))/R_{FA}(n_0)| > \eta_1 \qquad (3)$$

$$|R_{FA}(n+1) - R_{FA}(n_0))/R_{FA}(n_0)| < \eta_2 \qquad (4)$$

Here, $R_{FA}$ ($n_0$) is an average value of a group immediately before the group composed of M pieces of data to which $R_F$ (n) belongs (for which the average value will be calculated). In addition, $\eta_1$ and $\eta_2$ are constants for determination and are accepted by the HMI 150 as external inputs (initial conditions).

When inequalities (3) and (4) are satisfied for $R_F$ (n) and $R_F$ (n+1), the noise eliminator 123 determines that $R_F$ (n) is a value having noisy fluctuation and excludes $R_F$ (n) from the data.

The case where only $R_F$ (n) is a value having noisy fluctuation and $R_F$ (n+1) is a value in a normal range is illustrated as an example, but for example, when a value has noisy fluctuation multiple consecutive times, such as twice, and then returns to the normal range, the value having the noisy fluctuation multiple consecutive times may be excluded from the data. An upper limit of the number of times should be accepted by the HMI 150 as an external input (initial condition). Although an example of a method for excluding the noisy fluctuation is described here, it is not limited thereto and other methods may be used as long as the noise is eliminated.

The abnormality determination unit 124 derives the average resistance value $R_{FA}$ of the field winding 20 with respect to the average current value $I_{FA}$ using a field winding resistance versus current characteristic curve (hereinafter referred to as "characteristic curve") at the short-circuit time of the field winding 20 and determines it to be abnormal when the condition of the following inequality (5) is satisfied for the average resistance value $R_{FA}$.

$$R_{FSN} - \alpha < R_{FA} < R_{FSN} + \alpha \qquad (5)$$

Here, $R_{FSN}$ in inequality (5) indicates N (N=1 to Nmax) pieces of field winding resistance values at the interlayer short-circuit time. A neighborhood width α is a width to determine a state at the short-circuit time and may be set empirically as a value that is smaller than half of a difference between the field winding resistance values at the short-circuit time with one different number of short-circuit layers from each other and that can ensure the width necessary for a reliable determination. The maximum number of interlayer short-circuits, Nmax, and the neighborhood width, a, are part of initial conditions and are accepted by the HMI 150 as external inputs.

The past data selector 125 selects performance values to be displayed on the HMI 150 from a plurality of performance values based on conditions for displaying the performance values. Here, the HMI 150 can externally accept the conditions for displaying the performance values. The conditions for display are, for example, a limitation to a predetermined period. For the limitation to the period, the past data selector 125 extracts an average value data for the relevant acceptance time from the average value data stored in the field winding resistance calculated value memory 133, each with the acceptance time. The limitation may further include, for example, a limitation to representative values calculated by the representative value calculator 126, rather than the display of all the average value data for the predetermined period.

The representative value calculator 126 calculates the representative values from entire data (combination of average resistance value $R_{FA}$ (k) and average current value $I_{FA}$ (k)) for the period, that is, a time range selected by the past data selector 125. Concretely, an entire region of the field winding current is divided into a plurality of field winding current regions, and the representative values are calculated for each of the divided current regions. Here, the representative values include, for example, a maximum value of the average resistance value $R_{FA}$ (k), an average value of the average resistance value $R_{FA}$ (k), and a minimum value of the average resistance value $R_{FA}$ (k) for the data within each current region. However, the representative values are not limited thereto, and for example, an intermediate value of the average resistance value $R_{FA}$ (k) may be used instead of the average value of the average resistance value $R_{FA}$ (k). Here, the selected time range, the way the field winding current is divided into the field winding current regions (for example, a uniform field winding current value width for a divided region) is externally accepted by the HMI 150 as part of display condition parameters.

The image data generator 140 generates data for displaying images on the HMI 150 according to conditions specified through the HMI 150, based on information accepted from the calculation unit 120, the memory 130, or the determination control unit 160. The image data generator 140 may be, for example, a program or application that operates a computer and may be stored in a different computer from the computer system that houses the calculation unit 120.

The image data generator 140 generates image data for each of an operation image 145 and an interlayer short-circuit status image 146 described below, and has a characteristic curve image data generator 141, a latest performance image data generator 142, and a past performance image data generator 143 according to each purpose.

The characteristic curve image data generator 141 generates image data for the display of resistance curves by the HMI 150.

The latest performance image data generator 142 generates latest performance image data for displaying the average value data group composed of the latest F pieces of average value data (combination of the average resistance value $R_{FA}$ (k) and the average current value $I_{FA}$ (k) of the field winding) calculated by the average value calculator 122 based on equations (1) and (2). The number F of the latest average value data groups to be displayed is stored as a default value by the latest performance image data generator 142 but can be specified or changed by the HMI 150 by accepting it as an external input.

The HMI 150 displays this single average data as a single point. The HMI 150 also erases the display of the oldest point with an addition of the newest point so that F pieces of points are always displayed. Each point displayed is overplotted on the image with the characteristic curve displayed. That is, the latest performance image data is generated to display the average value data groups together with the characteristic curve. This screen with the latest performance image data overplotted on the characteristic curve is a default screen.

The past performance image data generator 143 generates past performance image data to display the representative values calculated by the representative value calculator 126 on the HMI 150 for the past average value data to be displayed selected by the past data selector 125. The points to be displayed are overplotted on the image with the characteristic curve displayed. Alternatively, the points are overplotted on the latest performance image.

Next, the memory 130 is described. The memory 130 memorizes and saves measured values obtained by the input unit 110, that is, the field winding current values $I_F$ and field winding voltage values $V_F$, the calculated values such as the field winding resistance values $R_F$ calculated by the calculation unit 120, the display conditions externally accepted by the HMI 150, and other data.

The memory 130 has an initial condition memory 131, a measured value memory 132, a field winding resistance calculated value memory 133, a field winding resistance characteristic memory 134, and a past performance display condition memory 136.

The initial condition memory 131 memorizes data accepted by the HMI 150 as external inputs. Initial conditions include parameters, or other conditions required for calculations by the calculation unit 120, conditions for displaying the latest performance, or other conditions.

The measured value memory 132 memorizes and saves the field winding current values $I_F$ and field winding voltage values $V_F$ obtained by the input unit 110.

The field winding resistance calculated value memory 133 sequentially memorizes and saves combinations of the field winding resistance value $R_F$ calculated by the field winding resistance calculator 121 and the corresponding field winding current value $I_F$, with the time they are accepted.

The field winding resistance characteristic memory 134 stores and saves dependence characteristics of the field winding resistance value on the field winding current value (field winding resistance versus current characteristics) in a normal state without interlayer short-circuit and an abnormal state with interlayer short-circuits that the HMI 150 accepts as external inputs. In this case, the dependence characteristics may be in a form of characteristic equations or table data. When the HMI 150 accepts correction data of the dependence characteristics as an external input, the correction data is also stored and saved.

The past performance display condition memory 136 memorizes and saves parameters for display that the HMI 150 externally accepts as conditions for its display. The parameters for display are described below in turn.

The human-machine interface (HMI) 150 is an interactive device with a monitoring person or other persons, having a display portion and an accepting portion of external inputs. The HMI 150 may, for example, be a touch panel that allows direct input to the screen, along with a screen for display. Alternatively, the HMI 150 may have an accepting portion, such as a port that can read contents of a memory device, such as a USB, or a transmission device, and other devices. Details of display contents of the HMI 150 and acceptance contents of external inputs will be described later, with reference to FIG. 2.

The determination control unit 160 controls progress of operations of each element in the field winding interlayer short-circuit monitoring device 100. The determination control unit 160 also performs determination when a determination is necessary for the progress of each operation. Conditions, determination values, and the like necessary for the determination may be stored in the determination control unit 160 in advance or may be externally accepted by the HMI 150.

Figure 2:
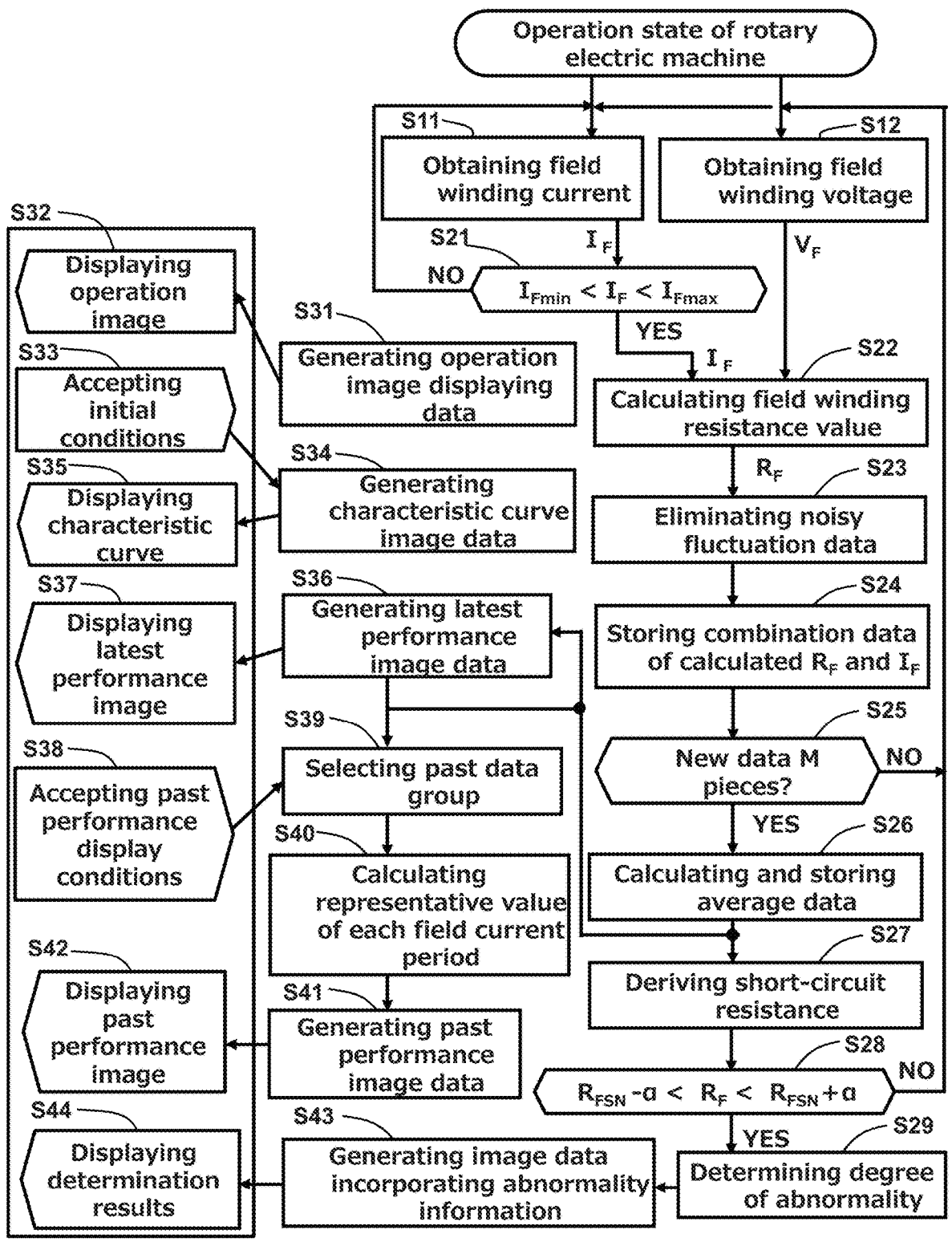
FIG. 2 is a flow chart illustrating a procedure of a field winding interlayer short-circuit monitoring method of the first embodiment.

FIG. 2 is a flow chart illustrating a procedure of a field winding interlayer short-circuit monitoring method of the first embodiment.

First, the input unit 110 obtains the field winding current value $I_F$ from the in-plant controller 200 (step S11) and the field winding voltage value $V_F$ from the in-plant controller 200 (step S12). The measured value memory 132 stores and memorizes the obtained field winding current value $I_F$ and field winding voltage value $V_F$.

The field winding resistance calculator 121 calculates the field winding resistance value $R_F$ by dividing the field winding voltage value $V_F$ by the field winding current value $I_F$ (step S22).

Prior to this calculation by the field winding resistance calculator 121, the determination control unit 160 determines whether the field winding current value $I_F$ satisfies a condition of the following inequality (6) (step S21). Only when the determination control unit 160 determines that the condition is satisfied (step S21 YES), the process proceeds to step S22, and when the determination control unit 160 does not determine that the condition is satisfied (step S21 NO), the process returns to step S11 to obtain the next field winding current value $I_F$.

$$I_{Fmin} < I_F < I_{Fmax} \qquad (6)$$

Here, the HMI 150 obtains condition values for determination, $I_{Fmin}$ and $I_{Fmax}$, as external inputs. These condition values are set with a sufficient margin for the normal fluctuation range of the field winding current value $I_F$.

Next, the noise eliminator 123 performs noisy fluctuation data elimination for the field winding resistance value $R_F$ calculated in step S22 (step S23). That is, the noise eliminator 123 determines whether the field winding resistance value $R_F$ is a value with noisy fluctuation, and if so, excludes the value from the data.

Next, the field winding resistance calculated value memory 133 sequentially stores and saves the combination data of the calculated field winding resistance value $R_F$ and the corresponding field winding current value $I_F$ along with the accepted time (step S24).

Next, the determination control unit 160 determines whether M pieces of new field winding resistance value $R_F$ data after the previous average value calculation (step S26, described below) have been accumulated (step S25). When the determination control unit 160 does not determine that M pieces of data have been accumulated (step S25 NO), the process returns to steps S11 and S12 to accept more new data.

When the determination control unit 160 determines that M pieces of data have been accumulated (step S25 YES), the average value calculator 122 uses the new M pieces of field winding resistance values $R_F$ and field winding current values $I_F$ to calculate their average resistance value $R_{FA}$ (k) and average current value $I_{FA}$ (k) by the aforementioned equations (1) and (2) (step S26). The calculated average resistance value $R_{FA}$ (k) and average current value $I_{FA}$ (k) are sequentially stored and saved in the average value memory 135 along with the average value of the acceptance time.

Next, the abnormality determination unit 124 derives a field winding resistance value $R_{FS}$ corresponding to the average current value $I_{FA}$ (k) on the characteristic curve at the interlayer short-circuit time of the field winding 20 (step S27). When there are a plurality of characteristic curves at the interlayer short-circuit time, N (N=1 to Nmax) pieces of field winding resistance values $R_{FS}$ at the interlayer short-circuit time are derived for all the characteristic curves.

Next, the abnormality determination unit 124 determines whether the condition of the aforementioned inequality (5) is satisfied for the average resistance value $R_{FA}$ (k) (step S28). That is, it is determined whether or not the data (average resistance value $R_{FA}$ (k) and average current value $I_{FA}$ (k)) are in the neighborhood of the characteristic curve at the short-circuit time.

$$R_{FSN-\alpha} < R_{FA} < R_{FSN} + \alpha \tag{5}$$

When the abnormality determination unit 124 determines that the condition in inequality (5) is not satisfied (step S28 NO), the process returns to steps S11 to S15, and acceptance of new data is repeated.

When the abnormality determination unit 124 determines that the condition in inequality (5) is satisfied (step S28 YES), the abnormality determination unit 124 determines a degree of abnormality (step S29), including information regarding which characteristic curve of the short-circuit layer is in the neighborhood of the data. The abnormality determination unit 124 outputs the determination result of the degree of abnormality to the image data generator 140. The image data generating unit 140 generates image data that incorporates the display of this determination information on the degree of abnormality in the image data generated by the latest performance image data generator 142 or the past performance image data generator 143 (step S43), which are described later, and the HMI 150 displays the generated image data (step S44).

The above is the flow of information processing leading to the abnormality determination. Next, the flow of information processing and action of the field winding interlayer short-circuit monitoring method according to the image data generator 140 and the HMI 150 will be explained.

First, the image data generator 140 generates data for displaying the operation image (step S31). The HMI 150 displays the operation image based on the data for displaying the operation image (step S32).

Figure 3:
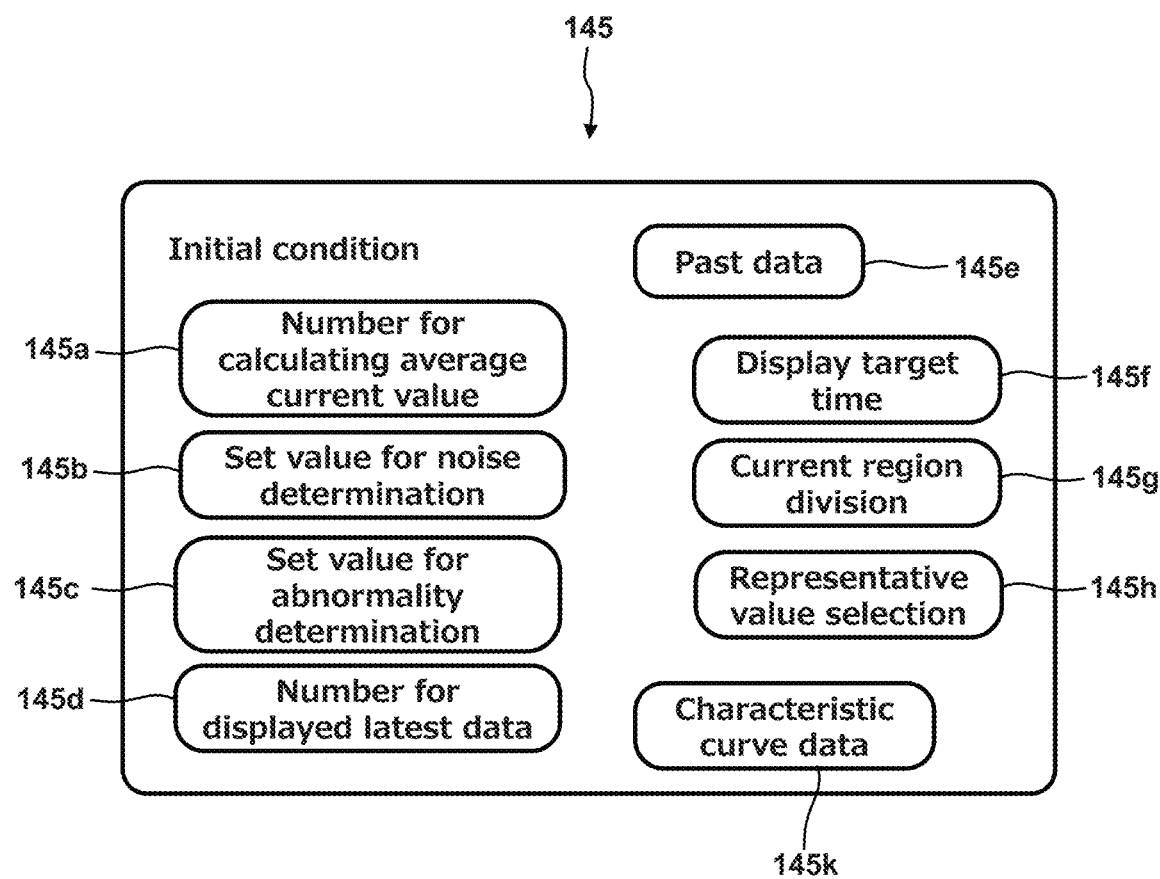
FIG. 3 is a diagram illustrating an example of an operation image to be displayed on an HMI of the field winding interlayer short-circuit monitoring device of the first embodiment.

FIG. 3 is a diagram illustrating an example of an operation image 145 displayed on the HMI 150 of the field winding interlayer short-circuit monitoring device 100 of the first embodiment. The HMI 150 always displays the operation image 145 alongside the latest or past performance image, which will be described later.

The operation image 145 displays icons for initial conditions, icons for past data, and icons for characteristic curve data.

Those related to the initial conditions include a number icon 145*a* for calculating average current value, a set value icon 145*b* for noise determination, a set value icon 145*c* for abnormality determination, and a number icon 145*d* for displayed latest data.

The number icon 145*a* for calculating average current value relates to the predetermined number M in equations (1) and (2). The set value icon 145*b* for noise determination relates to $\eta_1$ in inequality (3) and $\eta_2$ in inequality (4). The set value icon 145*c* for abnormality determination relates to a in inequality (5). The number icon 145*d* for displayed latest data relates to the number of points F to be displayed in the image.

The icons related to the past data include a past data icon 145*e*, a display target time icon 145*f*, a current region division icon 145*g*, a representative value selection icon 145*h*, and a characteristic curve data icon 145*k*.

When the past data icon 145*e* is touched, processing related to the display of past data is started and the past performance data are displayed. The display target time icon 145*f* is an icon for specifying a time range that the past data selector 125 should select from the past performance data group, that is, for specifying the data to be displayed from what time to what time. The current region division icon 145*g* is an icon for specifying a range of the respective current regions when the representative value calculator 126 calculates the representative value, for example, a width of the divided current. The representative value selection icon 145*h* is an icon for selecting the representative value when the representative value calculator 126 calculates the representative value.

The characteristic curve data icon 145*k* relates to the external input of data for the creation of field winding resistance versus current characteristic curves for the field winding 20 in the normal state and the abnormal state. For example, touching the characteristic curve data icon 145*k* displays an option to read the characteristic data on screen or read through USB or other means.

For each of the icons described above, a pull-down function has been added to display selection candidates, if necessary. In addition, direct input is also possible.

FIG. 3 illustrates the case where the icons for operation input are grouped together as a separate operation screen from the latest performance image or past performance image as an example but is not limited thereto. For example, each icon may be displayed within the latest performance image or past performance image. A single icon may be displayed at a plurality of locations.

In FIG. 3, the case where each operation item is provided as an icon is illustrated as an example, but is not limited thereto. For example, each may be an individual operation part such as a push button instead of a touch panel system.

In accordance with the displayed screen, the HMI 150 accepts initial conditions and characteristic curve data as external inputs (step S33). The initial screen may be, but is not limited to, the operation screen and the display of the latest performance data group on the characteristic curve as described below.

The initial conditions include the value of the number M used in equations (1) and (2) when calculating the average value, the constants $\eta_1$ and $\eta_2$ for determination used in the noise elimination by inequalities (3) and (4), the neighborhood width $\alpha$ when determining the field winding current value $I_F$ by inequality (5), the data necessary for the calculation of the calculation unit 120 including the condition values $I_{Fmin}$ and $I_{Fmax}$ for determination by inequality (6), and the display conditions of the latest performance including, for example, the number of points F to be displayed in the image. The initial condition memory 131 stores and saves the read initial conditions.

The characteristic curve data is dependence characteristics of the field winding resistance value on the field winding current value in the normal state and the abnormal state and may be specified by a function such as a quadratic function or in a form of a table, for example. The field winding resistance characteristic memory 134 stores and saves the characteristic curve data.

The calculation unit 120 reads necessary data from the initial condition memory 131 or the field winding resistance characteristic memory 134, depending on the content of the calculation.

Next, the characteristic curve image data generator 141 generates characteristic curve image data using the data specifying the characteristic curve accepted by the HMI 150 (step S34).

Next, the HMI 150 displays an image of the characteristic curve based on the generated characteristic curve image data (step S35).

Next, the latest performance image data generator 142 generates the latest performance image data (step S36). Concretely, the latest performance image data is generated based on the display conditions memorized in the initial condition memory 131, using the average value data (average resistance value $R_{FA}$ (k) and average current value $I_{FA}$ (k)) stored in the average value memory 135. At this time, the image data is updated so that the oldest data is deleted and a present value is added instead since the number of points F of the latest data to be displayed in the image is given. The HMI 150 displays the latest performance image based on the image data generated by the latest performance image data generator 142 (step S37).

Figure 4:
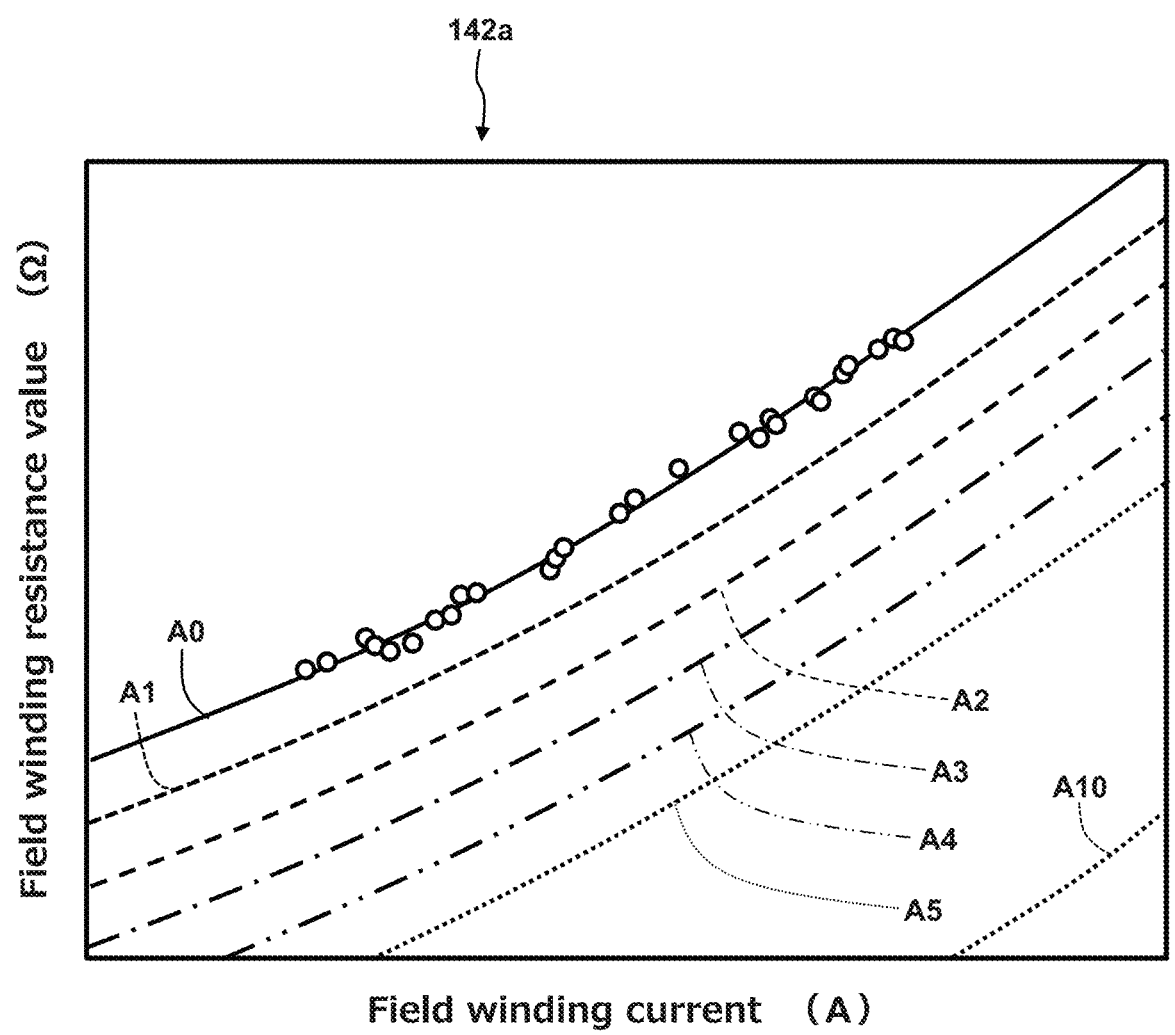
FIG. 4 is a first image illustrating an example of a latest performance image to be displayed on the HMI of the field winding interlayer short-circuit monitoring device of the first embodiment.

FIG. 4 is a first latest performance image 142a illustrating an example of the latest performance image to be displayed on the HMI 150 of the field winding interlayer short-circuit monitoring device 100 of the first embodiment.

The field winding current (A) on the horizontal axis of the graphic chart in the first latest performance image 142a is the field winding current value. The field winding resistance value (Ω) on the vertical axis is the field winding resistance value.

Figure 16:
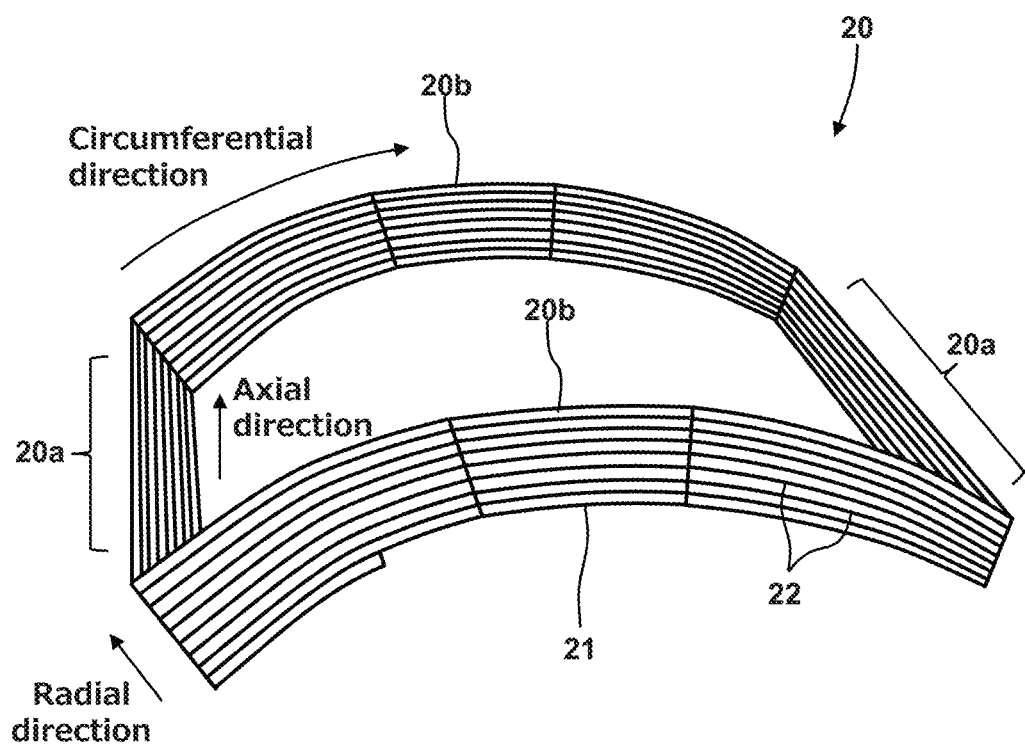
FIG. 16 is a conceptual perspective diagram illustrating a general field winding of the rotary electric machine.
Figure 17:
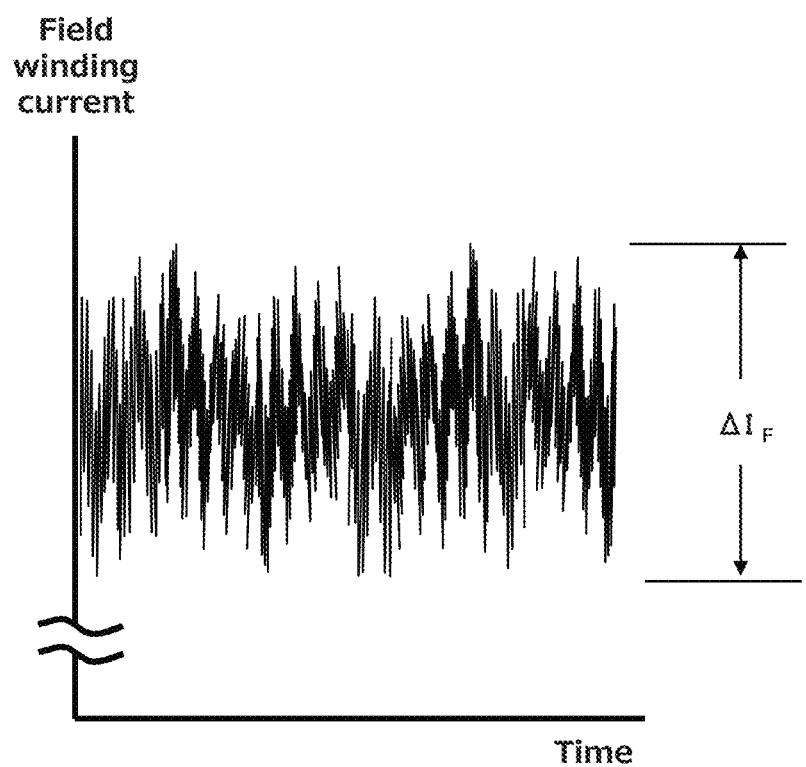
FIG. 17 is a conceptual graphic chart illustrating an example of fluctuation of a field winding current over time under normal conditions.

The curves displayed in the first latest performance image 142a are the field winding resistance versus current characteristic curves ("characteristic curves") and indicate the characteristic curves in order of increasing field winding resistance value, where curve A0 indicates the field winding 20 (FIG. 16) when it is sound, curves A1 to A5 indicate the field winding 20 at one-layer to five-layer short-circuited times, respectively, and A10 indicates the field winding 20 at ten-layer short-circuit time. These characteristic curves are displayed based on the image data generated by the characteristic curve image data generator 141. In FIG. 4, the characteristic curves at the six-layer to nine-layer short-circuit times are not displayed, but may be displayed. The curve up to how many layers is displayed when it is short-circuited can be set by input to the HMI 150.

The above points regarding the first latest performance image 142a are the same for the following images.

In the first latest performance image 142a, the latest data groups are illustrated as overplotted on the characteristic curve with white circles. Each circle indicates a point at a coordinate of ($I_{FA}$ (k), $R_{FA}$ (k)). Here, k is the consecutive number F, including the latest. The number F to be displayed is the value accepted by the HMI 150 as the external input (initial condition).

In the first latest performance image 142a, all points are in the neighborhood of the characteristic curve A0 at the sound time, indicating that no interlayer short circuit has occurred. This case is indicated by the white circle.

Figure 5:
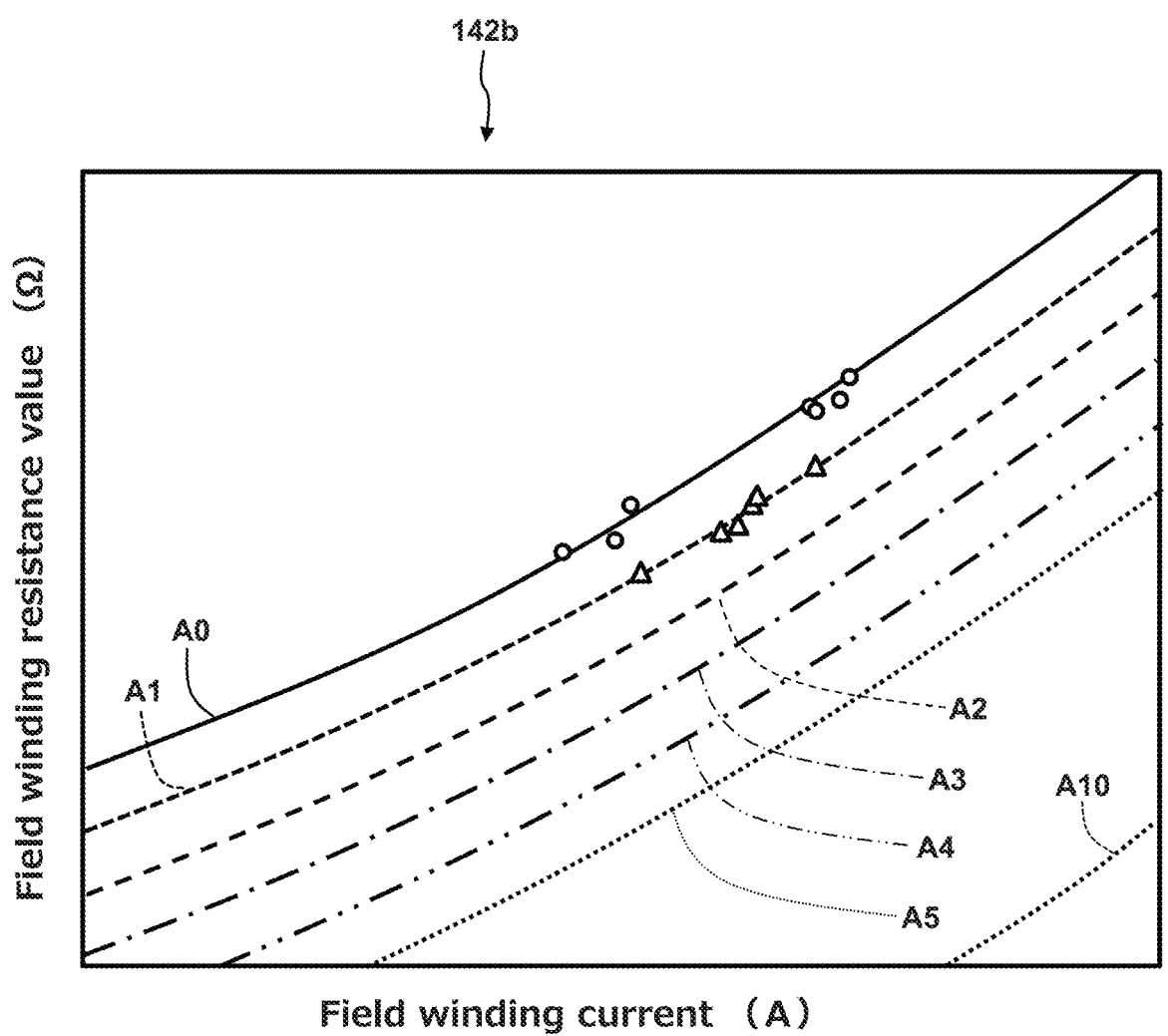
FIG. 5 is a second image illustrating an example of the latest performance image to be displayed on the HMI of the field winding interlayer short-circuit monitoring device of the first embodiment.

FIG. 5 is a second latest performance image 142b illustrating an example of the latest performance image to be displayed on the HMI 150 of the field winding interlayer short-circuit monitoring device 100 of the first embodiment.

In the second latest performance image 142b, a total of F pieces of white circles and white triangles are displayed as the latest data groups. Here, the white triangles are in the neighborhood of the characteristic curve A1, indicating that the state is at the one-layer short circuit time. The points may be indicated by other symbols instead of white circles and white triangles, or distinguished by colors, and the like, as long as each state can be distinguished.

Figure 6:
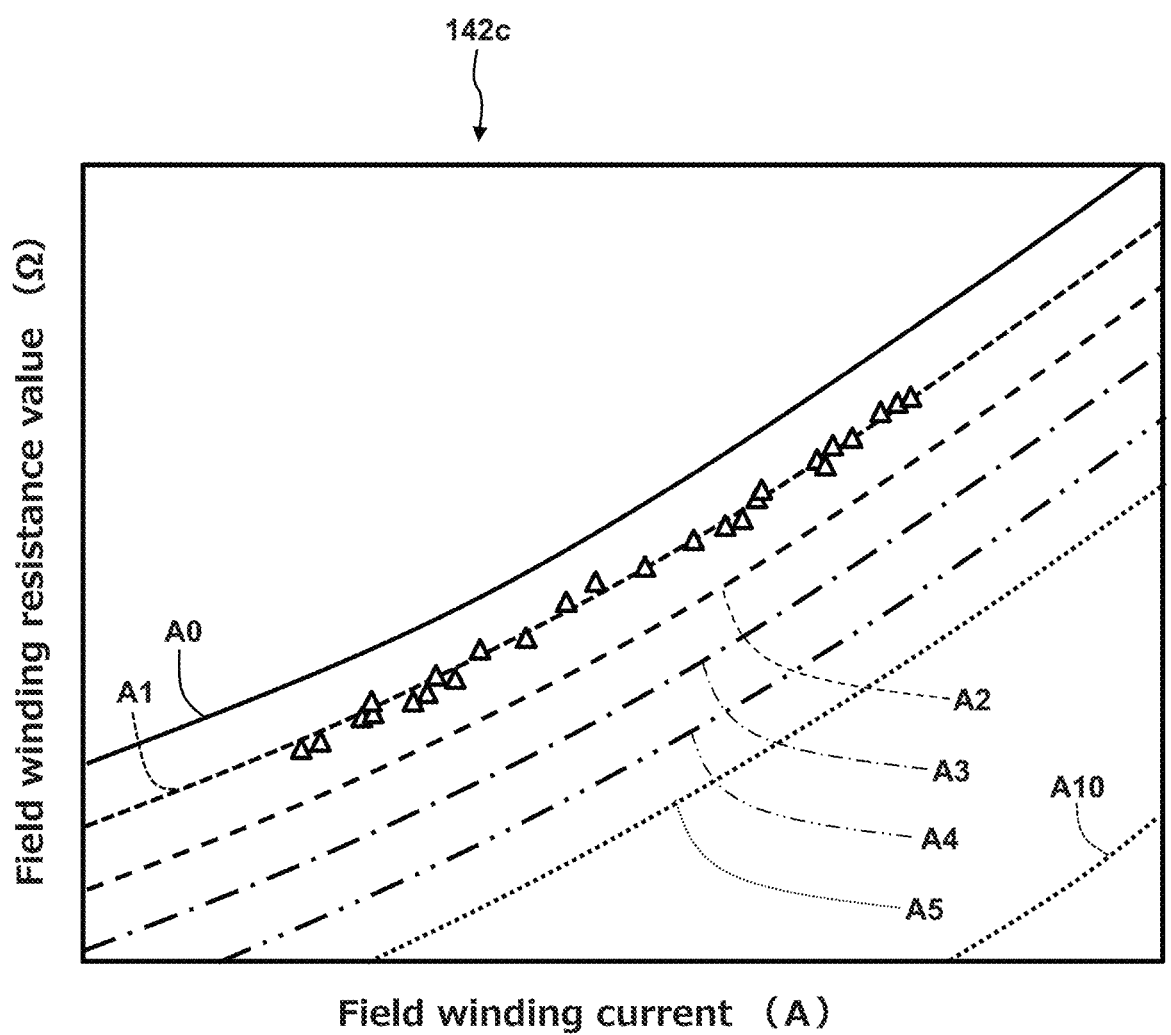
FIG. 6 is a third image illustrating an example of the latest performance image to be displayed on the HMI of the field winding interlayer short-circuit monitoring device of the first embodiment.

FIG. 6 is a third latest performance image 142c illustrating an example of the latest performance image to be displayed on the HMI 150 of the field winding interlayer short-circuit monitoring device 100 of the first embodiment.

In the third latest performance image 142c, all points are in the neighborhood of the characteristic curve A1 at the one-layer short-circuit time, indicating that the one-layer short-circuit state has continued since a certain point in the past. In this screen, it is not possible to determine when in the past the one-layer short circuit occurred.

Next, the HMI 150 accepts the past performance display conditions (step S38). Concretely, the monitoring person or other persons select the past data icon 145e on the operation screen based on the operation image 145 illustrated in FIG. 3. In addition, the monitoring person inputs the display conditions or display change conditions by using the display target time icon 145f, the current region division icon 145g, the representative value selection icon 145h, or other icons.

When the past data icon 145e is selected, the past data selector 125 selects a past data group (step S39) based on the conditions regarding the past data accepted by the HMI 150 together with the initial conditions in step S33 or conditions corrected in step S38. Furthermore, the representative value calculator 126 calculates representative values to be displayed (step S40).

Next, the past performance image data generator 143 generates past performance image data for a past performance screen to be displayed on the HMI 150 (step S41). The HMI 150 displays the past performance image based on this data (step S42).

Figure 7:
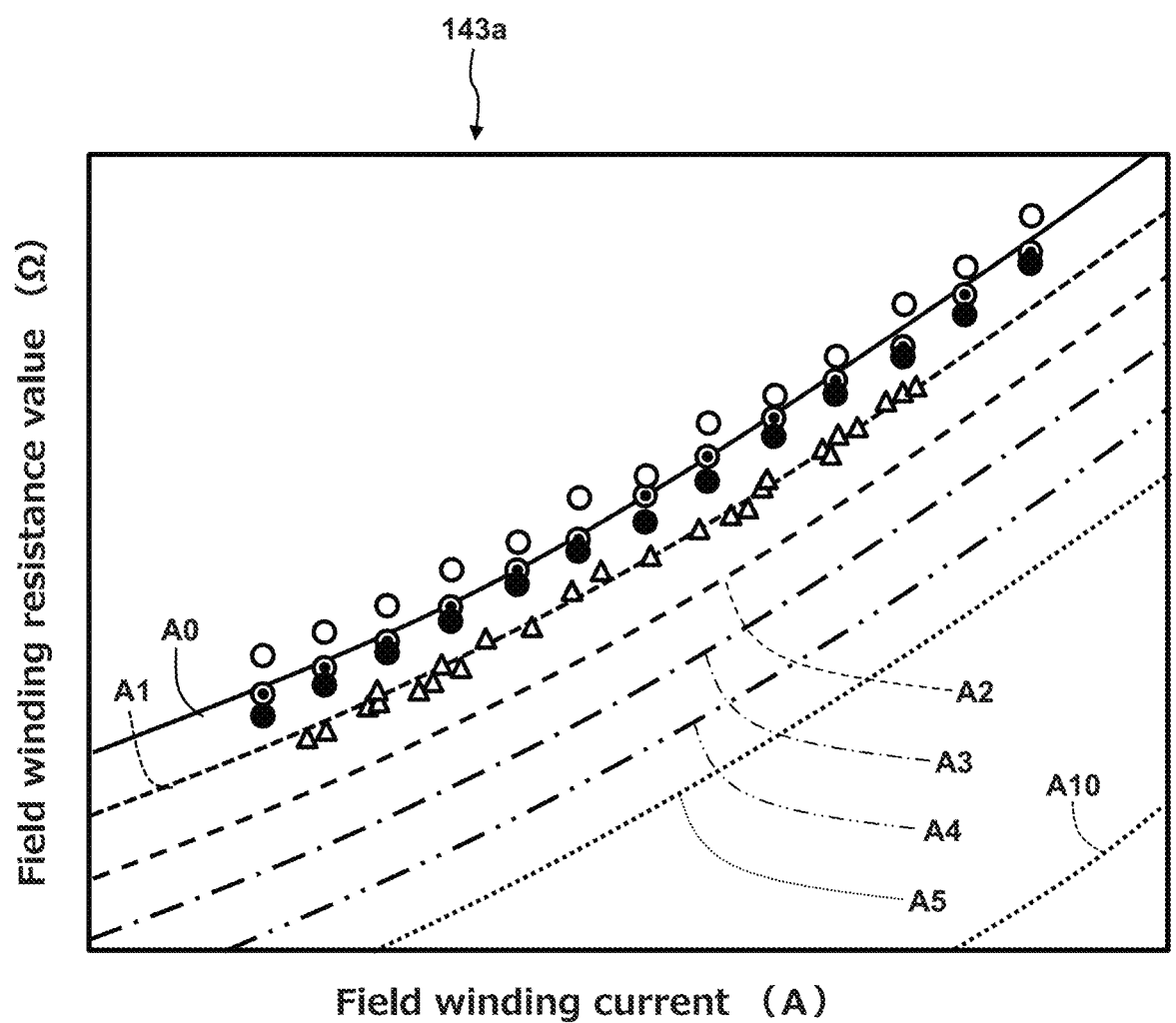
FIG. 7 is a first image illustrating an example of a past performance image with selected past performance display conditions to be displayed on the HMI of the field winding interlayer short-circuit monitoring device of the first embodiment.

FIG. 7 is a first past performance image 143a illustrating an example of the past performance image with selected past performance display conditions to be displayed on the HMI 150 of the field winding interlayer short-circuit monitoring device 100 of the first embodiment.

The first past performance image 143a is a display screen when a certain period in the past is specified in the one-layer short circuit situation illustrated in FIG. 6.

The first past performance image 143a is displayed so that the past data groups are overplotted on the third latest performance image 142c illustrated in FIG. 6.

The first past performance image 143a is generated by the past performance image data generator 143. The displayed past data groups are those selected by the past data selector 125 based on the conditions accepted by the HMI 150. For each of the past data groups, only the representative values calculated by the representative value calculator 126 are displayed. In the case of the first past performance image 143a, the maximum, average, and minimum values are illustrated as representative values.

In the first past performance image 143a, all of the past data groups are in the neighborhood of the characteristic curve A0 and are for the normal period. In the first past performance image 143a, the maximum value is indicated by a white circle, the average value by a double circle, and the minimum value by a black circle.

Figure 8:
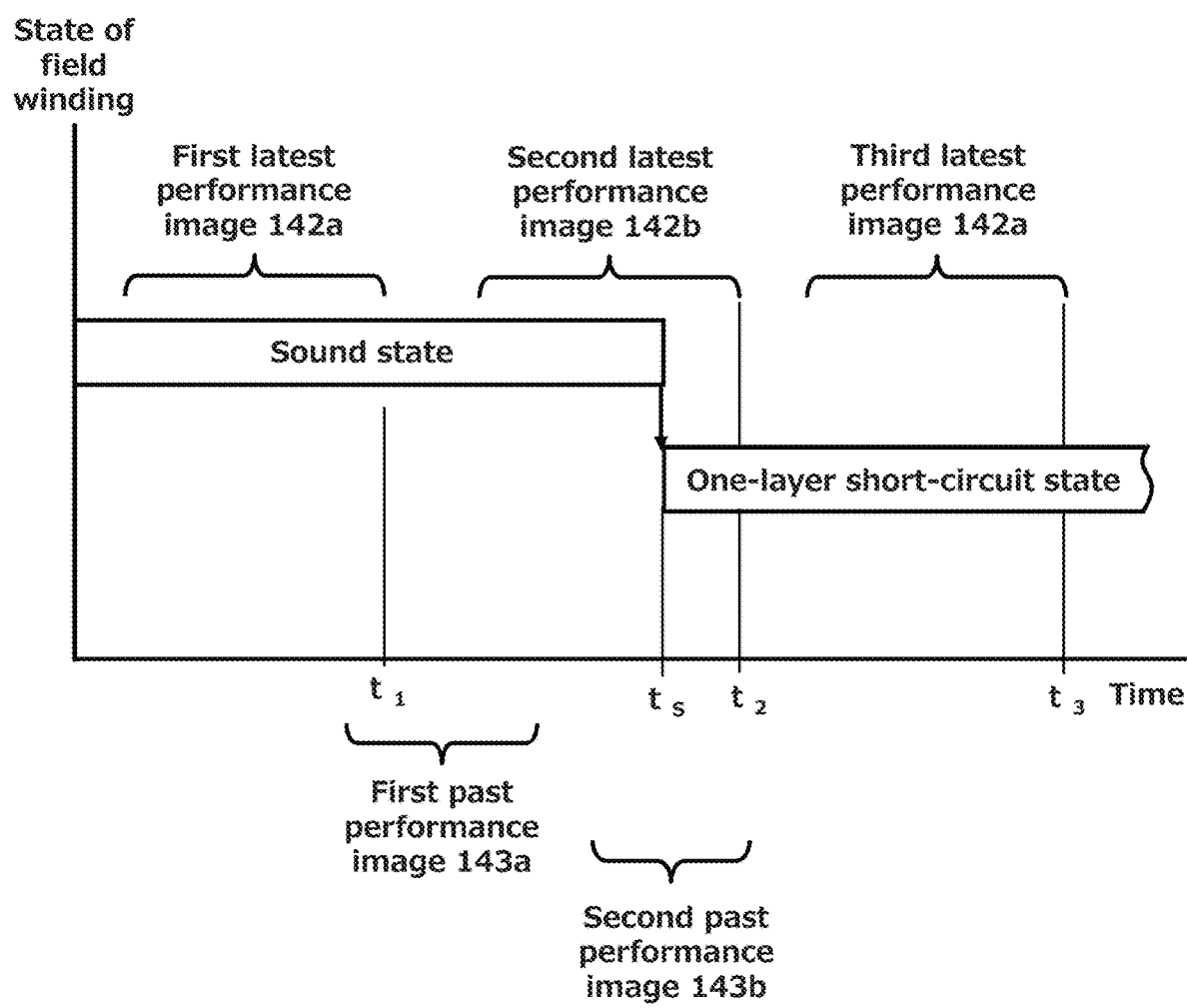
FIG. 8 is an explanatory diagram illustrating a selection of the past performance display conditions by a past data selector of the field winding interlayer short-circuit monitoring device of the first embodiment.

FIG. 8 is an explanatory diagram illustrating the selection of the past performance display conditions by the past data selector 125 of the field winding interlayer short-circuit monitoring device 100 of the first embodiment.

FIG. 8 illustrates the case where the field winding 20 transfers from the sound state to the one-layer short-circuit state at time $t_S$, as indicated by a white bar.

Time $t_1$ at which the first latest performance image 142a is obtained, as explained earlier, is the time when the field winding 20 is in the sound state. Time $t_2$ at which the second latest performance image 142b is obtained is the time immediately after the field winding 20 has transferred from the sound state to the one-layer short-circuit state. Time $t_3$ at which the third latest performance image 142c is obtained is the time when the field winding 20 is in the one-layer short-circuit state.

The first past performance image 143a illustrated in FIG. 7 is the result of selecting the period when the field winding 20 is in the sound state and illustrates the past data groups in the sound state.

Figure 9:
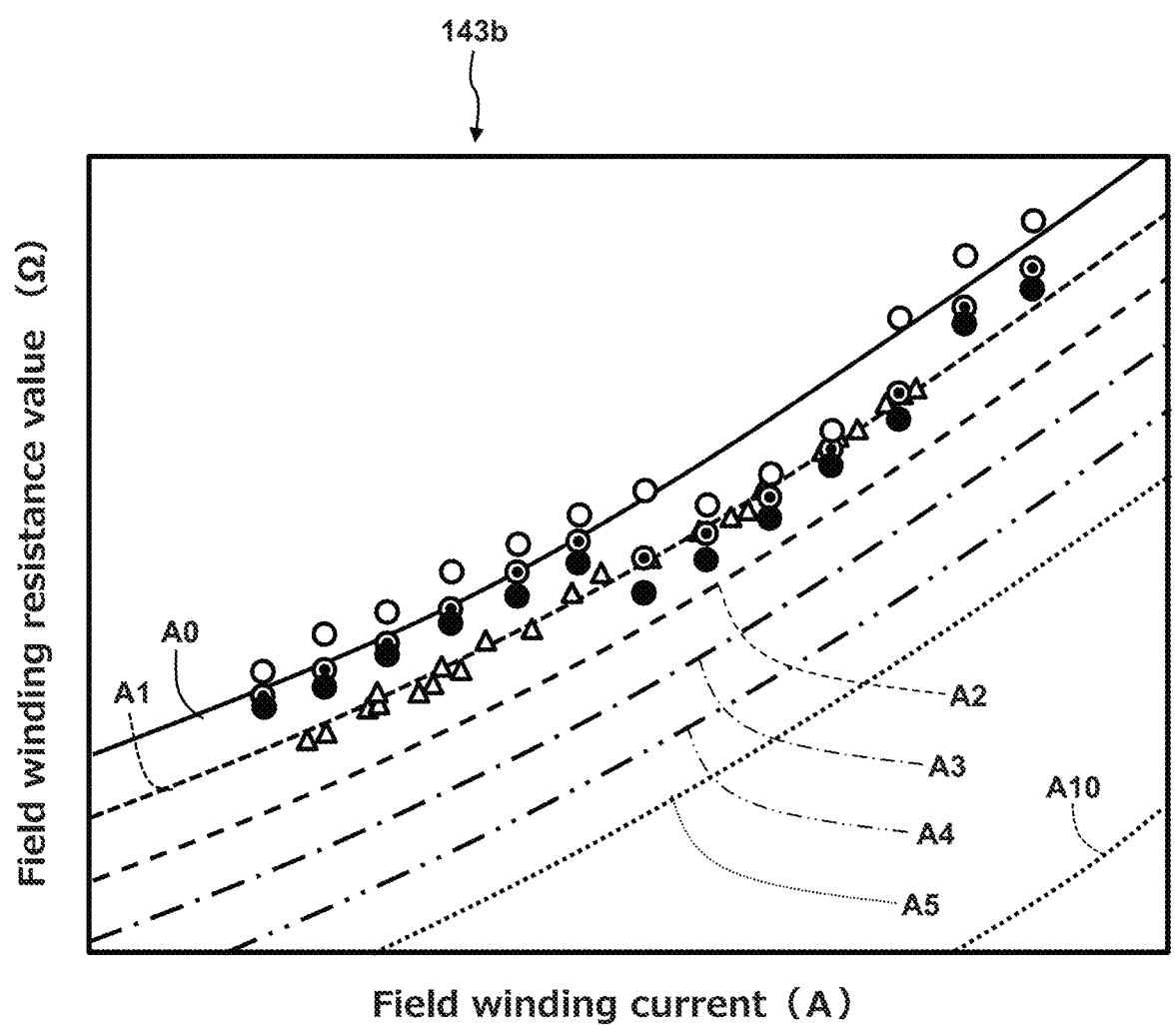
FIG. 9 is a second image illustrating an example of the past performance image with selected past performance display conditions to be displayed on the HMI of the field winding interlayer short-circuit monitoring device of the first embodiment.

Now, when an appropriate period, including time $t_S$, is input to the HMI 150, a second past performance image 143b is obtained, as illustrated in FIG. 9 next.

FIG. 9 is the second past performance image 143b illustrating an example of the past performance image with selected past performance display conditions to be displayed on the HMI 150 of the field winding interlayer short-circuit monitoring device 100 of the first embodiment.

FIG. 9 illustrates both points that exist in the neighborhood of characteristic curve A0 and points that exist in the neighborhood of characteristic curve A1 as the past data groups for the second past performance image 143b.

Here, the maximum, average, and minimum values for the data after the one-layer short-circuit among the past data groups are indicated with the same sign as at the sound time, but they may be distinguished by different signs or colors to make them easier to distinguish.

As described above, according to the field winding interlayer short-circuit monitoring device 100 of this embodiment, it is possible to know from the display screen whether the field winding 20 is in the sound state or in the state where the interlayer short-circuit has occurred by displaying the latest performance data groups overplotted on the field winding resistance versus current characteristic curve. In this case, the data processing can also maintain a stable state display by eliminating singularly changed data or using average values.

In addition, since the past data can be selected by specifying a period, the point in time when a change in the state of the field winding 20, such as the occurrence of the interlayer short circuit, occurs, can be determined retroactively.

Figure 10:
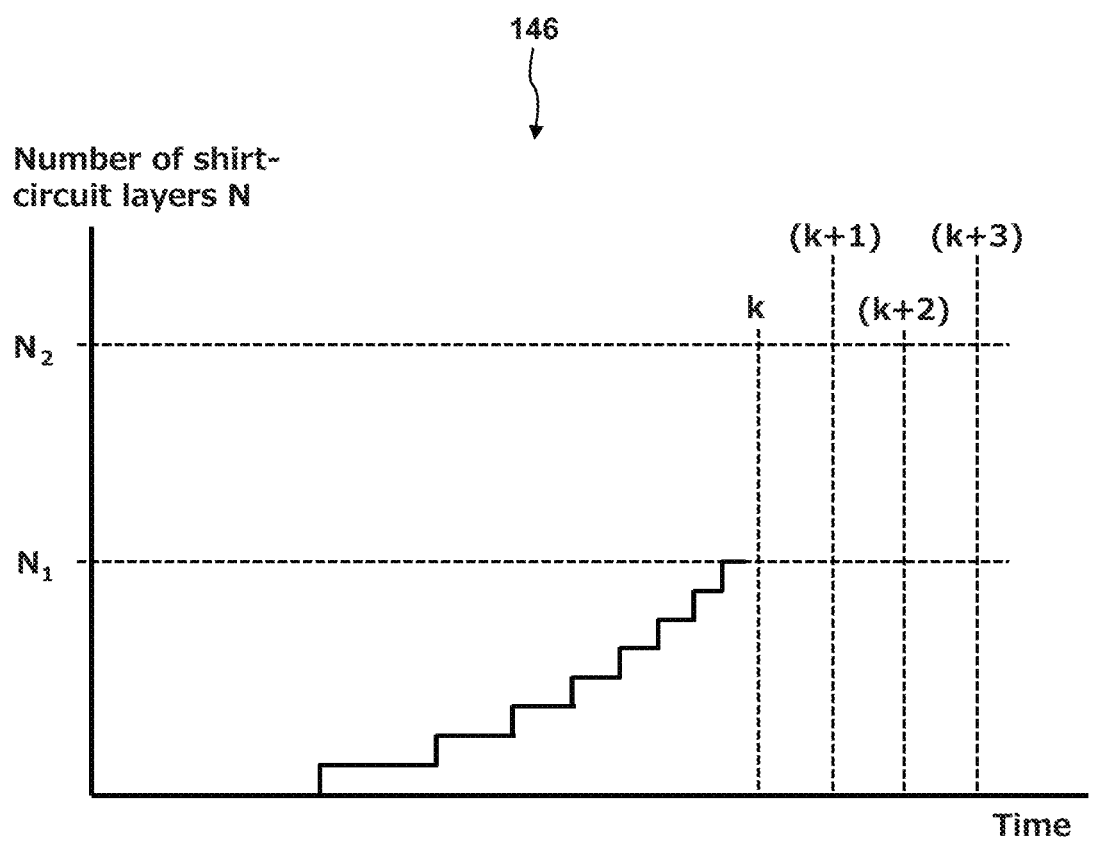
FIG. 10 is a display example of an interlayer short-circuit status image to be displayed on the HMI of the field winding interlayer short-circuit monitoring device of the first embodiment.

FIG. 10 is a display example of the interlayer short-circuit status image 146 to be displayed on the HMI 150 of the field winding interlayer short-circuit monitoring device of the first embodiment, and the image is generated by the image data generator 140.

The interlayer short-circuit status image 146 is in a graph form, with time on the horizontal axis and the number of short-circuit layers, N, on the vertical axis. Here, the number of short-circuit layers N is a total number of interlayers where the interlayer short circuit occurs. For example, when a plurality of short circuits occur between the i-th layer and the (i+1)-th layer, the number of short-circuit layers N shall be counted as one, since there is little difference in performance impact. When both the interlayer short circuit between the i-th layer and the (i+1)-th layer and the interlayer short circuit between the j-th layer and the (j+1)-th layer occur, the number of short-circuit layers N is counted as two (assuming that "i" is a different number from "j").

The (i+1)-th layer and the j-th layer may be the same layer, that is, it may be the case that the interlayer short circuits occur in consecutive layers.

The dashed lines parallel to the vertical axis and labeled k to (k+3) indicate a start of the plant's k-th periodic inspection to the (k+3)-th periodic inspection, respectively, as currently planned.

A staircase solid line indicates a situation where the number of short-circuit layers N increases by one with time. As illustrated in FIG. 9, and other figures, when a plurality of characteristic curves at the layer short-circuit time are displayed, such as A0, A1, . . . , the trend of increase in the number of short-circuit layers can be visually monitored, as illustrated in FIG. 10, with the following effects.

Normally, for example, in a power generator, a field magnetic flux is controlled to have a predetermined value. When an interlayer short circuit occurs, the number of coil turns is reduced, and the field winding current is increased by the reduced number of coil turns to maintain the amount of field magnetic flux. The increased field winding current is a current that would have been unnecessary when the field winding 20 is in a sound state, so to speak, wasted current is generated. The increase in the field winding current also increases copper loss in the field winding and cooling load.

Therefore, as the number of short-circuit layers N increases, as described above, it causes the generation of the wasted current and the increase in the cooling load, and structurally, operating conditions for the field winding 20, including an electrical insulation portion, also shift to the more severe side. This tendency increases as the number of short-circuit layers N increases. Therefore, the increasing trend of the number of short-circuit layers N with time is not linear as the number of short-circuit layers N increases, but the slope increases gradually. As a result, when a certain number of short-circuit layers N is reached, the situation becomes unacceptable and the need to replace the field winding 20 must be determined.

For example, suppose that when the number of short-circuit layers N reaches $N_2$, the field winding 20 needs to be replaced for the reasons described above. Here, the number of short-circuit layers $N_2$ may be provided by a power generator manufacturer or set by a power generator owner in consultation with the manufacturer.

The replacement of the field winding 20 must, of course, be carried out during the periodic inspection period when the plant is out of service. The replacement of the field winding 20 must be carried out after preparing each element and accessory of the field winding 20 for replacement. The replacement of the field winding 20 requires pulling out a power generator rotor, which requires adjustments to the process during the periodic inspections and adjustments on an arrangement of disassembled items on a turbine operation floor, or the like. In addition, the owner (operator) must secure the budget for this replacement.

In other words, it is usually difficult to implement the replacement in a first periodic inspection after the number of short-circuit layers N is found to become $N_2$. Therefore, for example, the owner (operator) must recognize in advance when the appropriate number of short-circuit layers $N_1$ ($N_1 < N_2$) is reached.

Although it is difficult to predict when the number of short-circuit layers N will become $N_2$ in terms of calculation, according to the interlayer short-circuit status image 146 illustrated in the example in FIG. 10, it is possible to assume to some extent when the number of short-circuit layers N will become $N_2$, allowing appropriate preparations to be made.

As described above, according to the field winding interlayer short-circuit monitoring device 100 of the present embodiment, the trend of the deterioration status of the field winding 20 can be determined by accurately grasping the point in time when a change in the status of the field winding 20 occurs. As a result, it is possible to secure a forecast of when to inspect, replace, or take other measures during each periodic inspection in the future. By securing the future forecast, the time when budgetary measures should be taken becomes clear, and it becomes possible to ensure that the appropriate measures are implemented.

Second Embodiment

Figure 11:
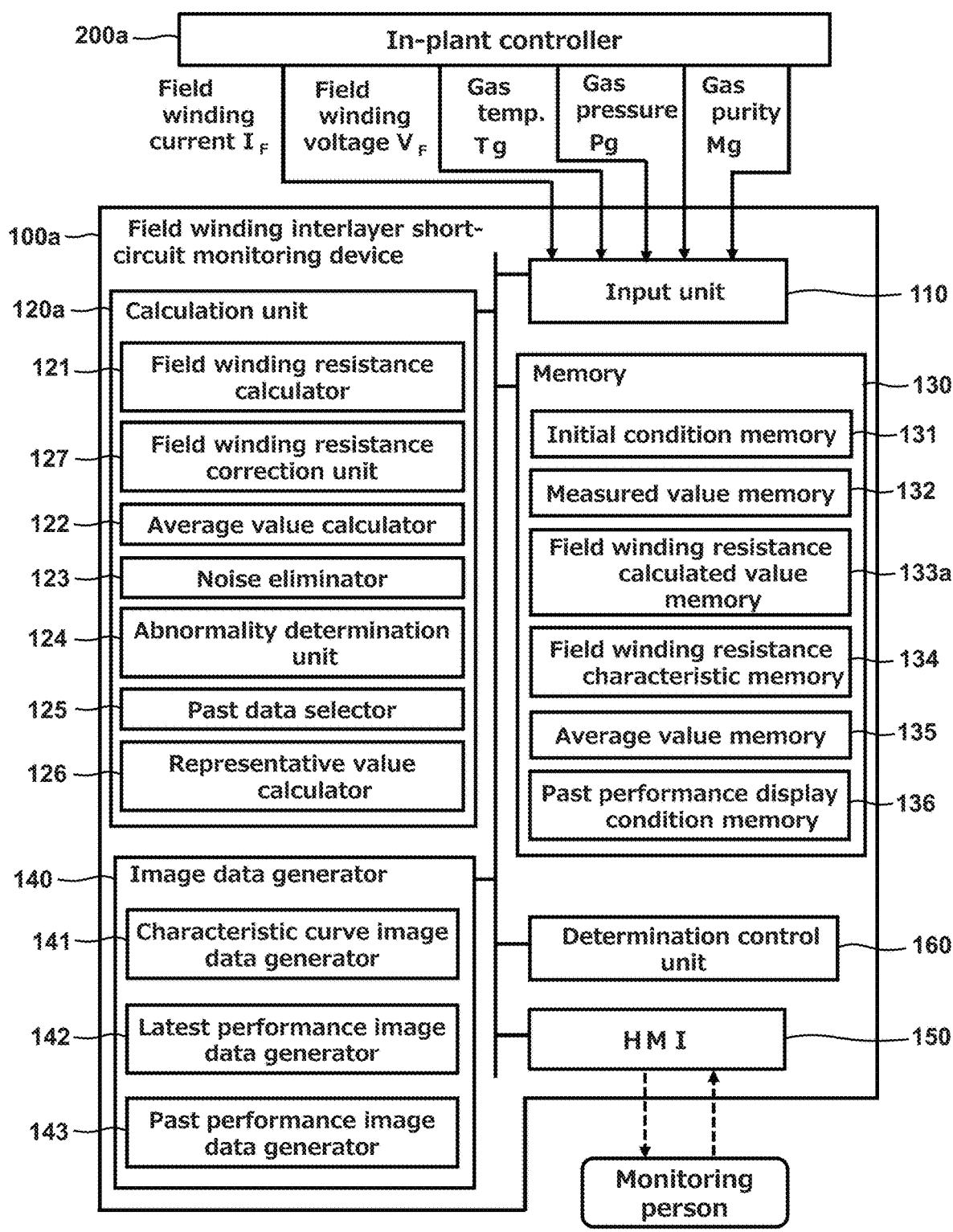
FIG. 11 is a block diagram illustrating a configuration of a field winding interlayer short-circuit monitoring device of a second embodiment.

FIG. 11 is a block diagram illustrating a configuration of a field winding interlayer short-circuit monitoring device 100*a* of a second embodiment.

This embodiment is a modification of the first embodiment. An calculation unit 120*a* of the field winding interlayer short-circuit monitoring device 100*a* further has a field winding resistance correction unit 127. The input unit 110 accepts and obtains values of gas temperature Tg, gas pressure Pg, and gas purity Mg from an in-plant controller 200*a*. Here, the gas temperature Tg, gas pressure Pg, and gas purity Mg are respective state values of cooling gas such as hydrogen sealed inside the rotary electric machine 1. The input unit 110 may directly accept outputs from respective detectors (not illustrated). The screens displayed by the HMI 150 are the same as in the first embodiment.

The field winding resistance correction unit 127 corrects the field winding resistance value $R_F$ calculated by the field winding resistance calculator 121 using the respective values of the gas temperature Tg, gas pressure Pg, and gas purity Mg obtained by the input unit 110, and sets a new field winding resistance value $R_F$.

The correction is made based on a difference of the gas temperature Tg, gas pressure Pg, and gas purity Mg with respect to reference values $Tg_0$, $Pg_0$, and $Mg_0$, respectively. In this case, when the difference is not too large, a linear equation may be used. Here, the difference is not too large, meaning that accuracy is within a range that allows the distinction from the interlayer short-circuit state described below. Here, the reference values may be memorized by the initial condition memory 131 or accepted by the HMI 150 as external inputs.

For example, in the case of correction of the gas temperature Tg, when the field winding resistance value calculated by the field winding resistance calculator 121 is set as $R_{F0}$, and the new resistance value is set as the field winding resistance value $R_F$, the field winding resistance correction unit 127 calculates the new field winding resistance value $R_F$ by the following equation (7).

$$R_F = [1 + \beta_T \cdot \{Tg \cdot G(Pg, Pg_0, Mg, Mg_0) - Tg_0\}] \cdot RF_0 \quad (7)$$

Where $\beta_T$ is a temperature coefficient of the material that makes up the field winding 20. When the unit of temperature is [° C.] or [K] and the unit of $R_F$ is [Ω], for example, when the winding is copper, a value such as 0.00393 is used for the $\beta_T$, but different values may be used depending on conditions such as winding material and operating temperature of the rotary electric machine 1. The G(Pg, $Pg_0$, Mg, $Mg_0$) is a function of the gas pressure Pg and gas purity Mg and their reference values $Pg_0$ and $Mg_0$. The value of the function G is theoretically determined by specific heat, viscosity coefficient, flow velocity, and other conditions of the gas, but for practical purposes, it can be determined by fitting or other means based on actual operating data.

Note that in equation (7), all effects of the gas temperature Tg, gas pressure Pg, and gas purity Mg are considered, but any combination of one or two of these may be used. It is preferable that at least the gas temperature Tg is included.

A field winding resistance calculated value memory 133*a* of the memory 130 stores and saves the new field winding resistance value $R_F$ obtained after the correction.

Figure 12:
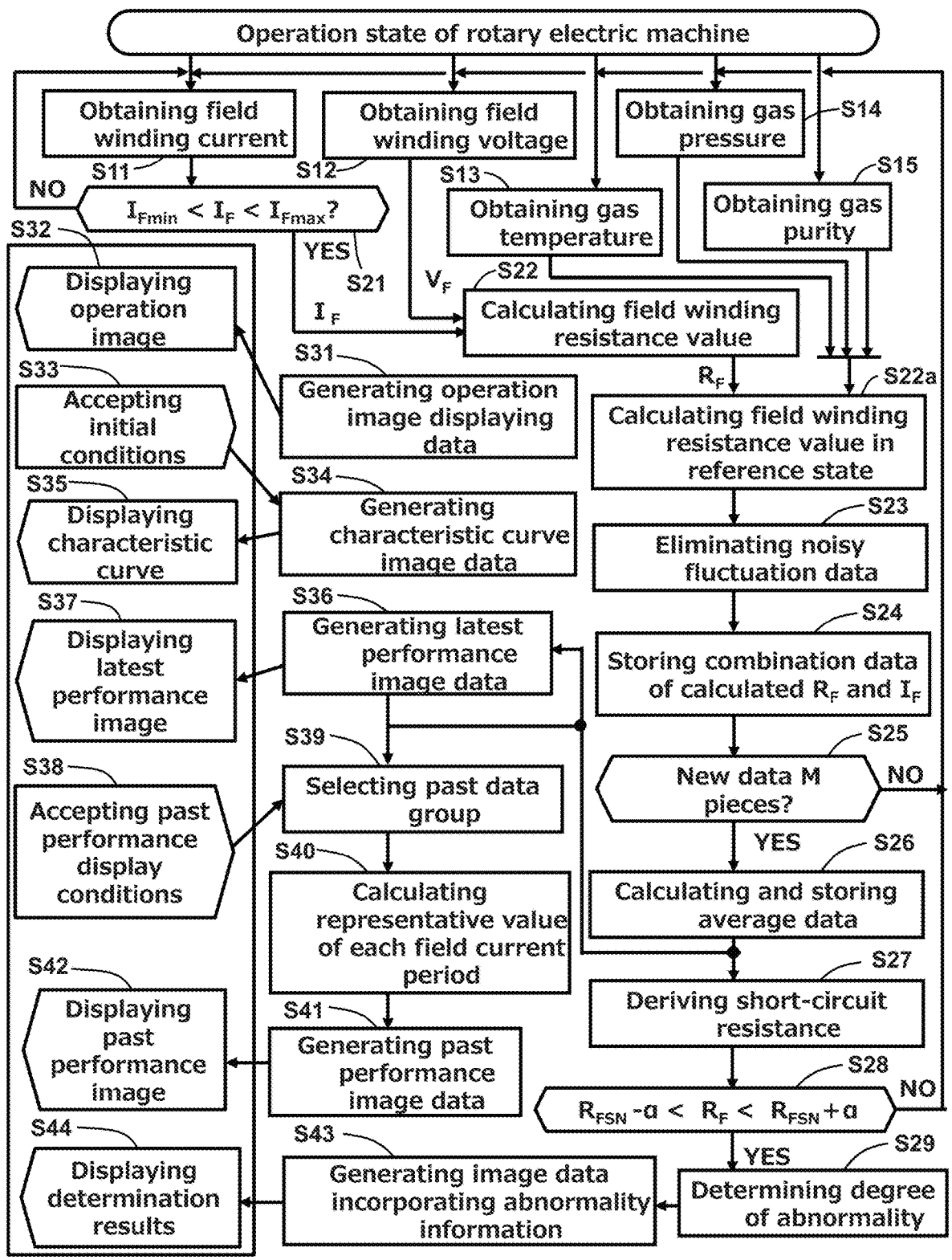
FIG. 12 is a flow chart illustrating a procedure of a field winding interlayer short-circuit monitoring method of the second embodiment.

FIG. 12 is a flow chart illustrating a procedure of a field winding interlayer short-circuit monitoring method of the second embodiment. Only those parts of the procedure that differ from the procedure in the first embodiment illustrated in FIG. 2 are described below.

First, the input unit 110 obtains the gas temperature Tg (step S13), gas pressure Pg, (step S14), and gas purity Mg (step S15) as environment condition of the rotor 2 from the in-plant controller 200*a*, along with the field winding current value $I_F$ and field winding voltage value $V_F$. In FIG. 12 for the gas temperature, gas pressure, and gas purity, measured values at a location away from the rotor, such as, for example, at an outlet of a gas cooler, may be used.

Next, the field winding resistance correction unit 127 corrects the field winding resistance value $R_F$ calculated by the field winding resistance calculator 121 in step S22 using the aforementioned equation (7) to calculate the field winding resistance value $R_F$ in the reference state (step S22*a*). The corrected and obtained new field winding resistance value $R_F$ is stored and memorized in the field winding resistance calculated value memory 133*a* after noisy fluctuation data is eliminated (step S23), along with the time it was accepted (step S24). The other procedures are the same as in the first embodiment.

Figure 13:
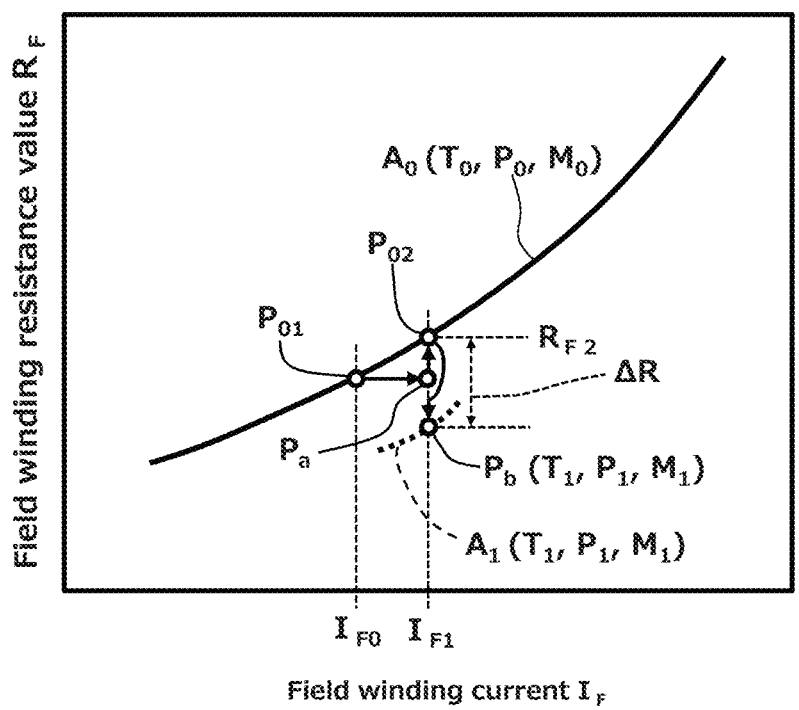
FIG. 13 is a graphic chart to explain correction by a field winding resistance correction unit of the field winding interlayer short-circuit monitoring device of the second embodiment.

FIG. 13 is a graphic chart to explain the correction by the field winding resistance correction unit 127 of the field winding interlayer short-circuit monitoring device 100*a* of the second embodiment.

The horizontal axis of the graphic chart illustrated in FIG. 13 is the field winding current value $I_F$ and the vertical axis is the field winding resistance value $R_F$. The signs P indicate (field winding current value $I_F$, field winding resistance value $R_F$) at the coordinates of the graphic chart in respective states.

Suppose now that the state was initially at position $P_{01}$ (field winding current value $I_{F0}$). Suppose that the field winding current value increases from $I_{F0}$ to $I_{F1}$. In this case, the Joule heat in the field winding 20 increases and the temperature of the field winding 20 rises, so the field winding resistance value increases, and the state shifts to $P_{02}$. That is, $P_{01}$ and $P_{02}$ are changes in state due only to fluctuations in the current value. Here, it is assumed that a state quantity of the cooling gas in the rotary electric machine 1 during this period is constant at the reference value. This set of combinations yields the characteristic curve $A_0$ ($T_0$, $P_0$, $M_0$).

On the other hand, when the state quantity of the cooling gas in the rotary electric machine 1 changes from gas temperature $Tg_0$, gas pressure $Pg_0$, and gas purity $Mg_0$ to gas temperature $Tg_1$, gas pressure $Pg_1$, and gas purity $Mg_1$, the state moves from $P_{02}$ to, for example, Pb ($Tg_1$, $Pg_1$, $Mg_1$). Pb ($Tg_1$, $Pg_1$, $Mg_1$) is a point on the characteristic curve $A_1$ ($T_1$, $P_1$, $M_1$), which is different from the characteristic curve $A_0$ ($T_0$, $P_0$, $M_0$).

The field winding resistance correction unit 127 corrects such a state of Pb ($Tg_1$, $Pg_1$, $Mg_1$) back to the reference state $P_{02}$ ($Tg_0$, $Pg_0$, $Mg_0$) and calculates the field winding resistance value $R_{F2}$ in the reference state.

Figure 14:
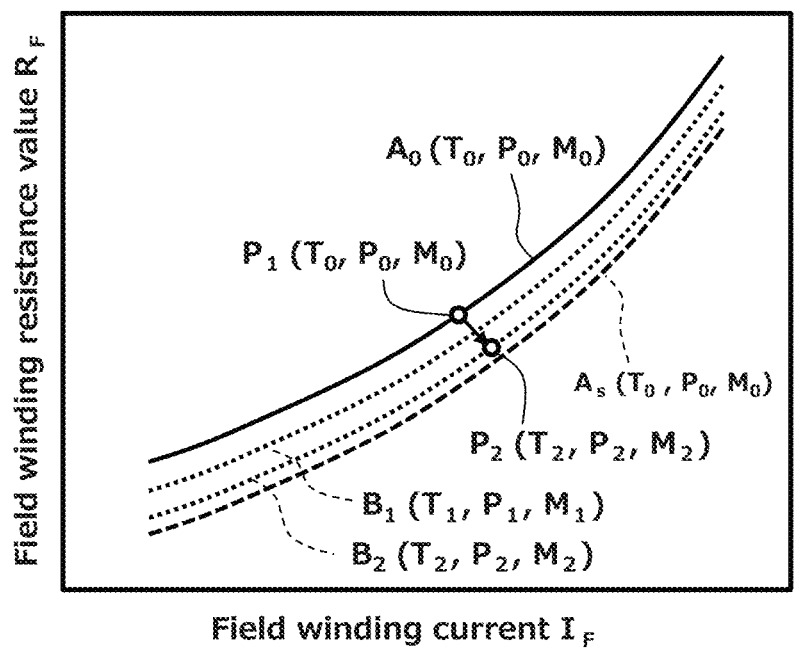
FIG. 14 is a graphic chart to explain an effect of the correction by the field winding resistance correction unit of the field winding interlayer short-circuit monitoring device of the second embodiment.

FIG. 14 is a graphic chart to explain an effect of the correction by the field winding resistance correction unit 127 of the field winding interlayer short-circuit monitoring device 100a of the second embodiment. The horizontal axis of the graphic chart illustrated in FIG. 14 is the field winding current value $I_F$ and the vertical axis is the field winding resistance value $R_F$.

In FIG. 14, $A_0$ ($T_0$, $P_0$, $M_0$) is the characteristic curve in the reference state, and characteristic curves $B_1$ ($T_1$, $P_1$, $M_1$) and $B_2$ ($T_2$, $P_2$, $M_2$) are the characteristic curves for two different states from the reference state. $A_S$ ($T_0$, $P_0$, $M_0$) is the characteristic curve at the one-layer short-circuit time in the reference state.

Now consider the case where the state value of the gas in the rotary electric machine 1 changes and what was initially in state $P_1$ ($T_0$, $P_0$, $M_0$) shifts to state $P_2$ ($T_2$, $P_2$, $M_2$), that is, the characteristic curve $B_2$ ($T_2$, $P_2$, $M_2$). As illustrated in FIG. 14, when the characteristic curve $B_2$ ($T_2$, $P_2$, $M_2$) is close to the characteristic curve $A_S$ ($T_0$, $P_0$, $M_0$) at the one-layer short-circuit time, it falls within the width of the determination in inequality (5) above, and a false determination that the one-layer short circuit has occurred may occur.

According to the field winding interlayer short-circuit monitoring device 100a of this embodiment, the correction is made to return the state from state $P_2$ ($T_2$, $P_2$, $M_2$) to state $P_1$ ($T_0$, $P_0$, $M_0$), so that the false determination that the one-layer short circuit has occurred will not occur.

According to the embodiments described above, it is possible to provide a field winding interlayer short-circuit monitoring device and a field winding interlayer short-circuit monitoring method that can easily determine whether or not a field winding interlayer short circuit occurs when operating and monitoring a power plant.

OTHER EMBODIMENTS

While certain embodiments have been described, these embodiments have been presented by way of example only, and are not intended to limit the scope of the inventions. For example, in the embodiments, the case where the field winding is provided on the rotor side is described as an example, but is not limited thereto. For example, the field winding may be provided on the stator side. The features of each embodiment may also be combined.

The embodiments may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A field winding interlayer short-circuit monitoring device for a rotary electric machine, the device comprising:
    an input unit configured to obtain field winding current values and field winding voltage values from the rotary electric machine at a predetermined sampling cycle;
    a memory configured to store a plurality of first field winding resistance versus current characteristic curves in an abnormal state with interlayer short-circuits and a second field winding resistance versus current characteristic curve in a normal state without interlayer short-circuit, each of the plurality of the first field winding resistance versus current characteristic curves being with different interlayer short-circuits from each other;
    a field winding resistance calculator configured to calculate a field winding resistance value by dividing each of the obtained field winding voltage values by each of the obtained field winding current values;
    an average value calculator configured to calculate an average resistance value and an average current value by averaging the field winding resistance values and the field winding current values obtained during a predetermined time interval respectively; and
    an image data generator configured to generate image data to display a predetermined number of average value data each composed of the average resistance value and the average current value along with the plurality of the first field winding resistance versus current characteristic curves in the abnormal state and the second field winding resistance versus current characteristic curve in the normal state.

2. The field winding interlayer short-circuit monitoring device according to claim 1, wherein
    the image data generator generates a latest performance image data including a latest average value data and a predetermined number of consecutive average value data preceding the latest average value data as an average value data group.

3. The field winding interlayer short-circuit monitoring device according to claim 1, wherein
    the image data generator generates a past performance image data as the image data by using the average value data for a selected past period as an average value data group.

4. The field winding interlayer short-circuit monitoring device according to claim 3, wherein
    the image data generator divides the average value data group into regions of the field winding current values and generates the past performance image data displaying representative values in each region.

5. The field winding interlayer short-circuit monitoring device according to claim 4, wherein
    the representative value is at least one of a maximum, average, intermediate, and minimum values of the average value data in the region of the field winding current value.

6. The field winding interlayer short-circuit monitoring device according to claim 1, wherein
    the field winding resistance value is corrected based on differences of at least one of temperature, pressure, and purity of cooling gas inside the rotary electric machine with respect to a reference value for the at least one of temperature, pressure, and purity of cooling gas inside the rotary electric machine.

7. A field winding interlayer short-circuit monitoring method for a rotary electric machine, the method comprising:
    a step for an input unit of obtaining field winding current values and field winding voltage values from the rotary electric machine at a predetermined sampling cycle;
    a step for a memory of storing a plurality of first field winding resistance versus current characteristic curves in an abnormal state with interlayer short-circuits and a second field winding resistance versus current characteristic curve in a normal state without interlayer short-circuit, each of the plurality of the first field winding resistance versus current characteristic curves being with different interlayer short-circuits from each other; and a step for a field winding resistance calculator of calculating a field winding resistance value by dividing each of the obtained field winding voltage values by each of the obtained field winding current values;

a step for an average value calculator of calculating an average resistance value and an average current value by averaging the field winding resistance values and the field winding current values obtained during a predetermined time interval respectively; and a step for an image data generator of generating image data to display a predetermined number of average value data each composed of the average resistance value and the average current value along with the plurality of the first field winding resistance versus current characteristic curves in the abnormal state and the second field winding resistance versus current characteristic curve in the normal state.

* * * * *